US012148925B2

(12) United States Patent
Luo et al.

(10) Patent No.: US 12,148,925 B2
(45) Date of Patent: Nov. 19, 2024

(54) ANODE ACTIVE MATERIAL FOR BATTERIES, AND METHOD FOR PREPARING SAME

(71) Applicants: Berzelius (Nanjing) Co., Ltd., Jiangsu (CN); Berzelius (Hefei) Co., Ltd., Anhui (CN)

(72) Inventors: Shu Luo, Jiangsu (CN); Zhe Li, Jiangsu (CN); Daosong Zha, Jiangsu (CN); Fang Wang, Jiangsu (CN); Cen Wang, Jiangsu (CN); Hebao Zhang, Jiangsu (CN)

(73) Assignees: Berzelius (Nanjing) Co., Ltd., Nanjing (CN); Berzelius (Hefei) Co., Ltd., Hefei (CN)

( * ) Notice: Subject to any disclaimer, the term of this patent is extended or adjusted under 35 U.S.C. 154(b) by 391 days.

(21) Appl. No.: 17/788,446

(22) PCT Filed: Dec. 29, 2020

(86) PCT No.: PCT/CN2020/140717
§ 371 (c)(1),
(2) Date: Jun. 23, 2022

(87) PCT Pub. No.: WO2021/136245
PCT Pub. Date: Jul. 8, 2021

(65) Prior Publication Data
US 2023/0034396 A1 Feb. 2, 2023

(30) Foreign Application Priority Data

Dec. 31, 2019 (CN) ......................... 201911406235.X
Dec. 31, 2019 (CN) ......................... 201911412337.2

(51) Int. Cl.
*H01M 4/485* (2010.01)
*H01M 4/02* (2006.01)
*H01M 4/62* (2006.01)

(52) U.S. Cl.
CPC ...... *H01M 4/485* (2013.01); *H01M 2004/021* (2013.01); *H01M 2004/027* (2013.01); *H01M 4/625* (2013.01)

(58) Field of Classification Search
None
See application file for complete search history.

(56) References Cited

FOREIGN PATENT DOCUMENTS

CN    103872298 A    6/2014
CN    105074973 A    11/2015
(Continued)

OTHER PUBLICATIONS

Machine Translation of CN108461723 (Year: 2018).*
(Continued)

*Primary Examiner* — Wyatt P McConnell
(74) *Attorney, Agent, or Firm* — Maier & Maier, PLLC

(57) ABSTRACT

An anode active material for batteries including anode active substance particles that include a silicon oxide compound. The anode active substance particles includes lithium and a non-lithium doping metal, where the non-lithium doping metal includes a metal M1 including one or more of titanium, magnesium, zirconium, zinc, aluminum, yttrium and calcium, and the content of the non-lithium doping metal in the anode active material is 0.01-20 wt %, for example 0.05-15 wt %, in another example 0.1-10 wt %, and in still another example 0.1-5 wt %. The anode active material has high water tolerance, and a secondary battery prepared from the anode active material has the advantages of high capacity, high coulombic efficiency and long cycle life.

17 Claims, 3 Drawing Sheets

(56) References Cited

FOREIGN PATENT DOCUMENTS

| | | |
|---|---|---|
| CN | 106654194 A | 5/2017 |
| CN | 106876684 A | 6/2017 |
| CN | 108140823 A | 6/2018 |
| CN | 108232144 A | 6/2018 |
| CN | 108461723 A | 8/2018 |
| CN | 109599551 A | 4/2019 |
| CN | 109713286 A | 5/2019 |
| CN | 109755500 A | 5/2019 |
| CN | 109920987 A | 6/2019 |
| CN | 110556529 A | 12/2019 |
| CN | 111162269 A | 5/2020 |
| CN | 111180692 A | 5/2020 |
| JP | 2017204374 A | 11/2017 |
| KR | 10-2015-0040141 A | 4/2015 |
| KR | 10-2015-0075207 A | 7/2015 |
| WO | 2019151016 A1 | 8/2019 |

OTHER PUBLICATIONS

Office Action issued on Jul. 4, 2023, in corresponding Japanese Application No. 2022-539340, 6 pages.

Decision to Grant a Patent issued on Dec. 19, 2023 in corresponding Japanese Application No. 2022-539340; 5 pages.

International Search Report mailed on Mar. 18, 2021, in corresponding International Application No. PCT/CN2020/140717; 7 pages (with English Translation).

First Search issued Oct. 14, 2020, in corresponding to Chinese Application No. 201911406235.X; 1 page.

First Office Action issued Oct. 22, 2020, in corresponding to Chinese Application No. 201911406235.X; 11 pages (with English Translation).

Supplemental Search issued May 10, 2021, in corresponding to Chinese Application No. 201911406235.X; 1 page.

The Second Office Action issued May 17, 2021, in corresponding to Chinese Application No. 201911406235.X; 13 pages (with English Translation).

First Search issued Oct. 14, 2020, in corresponding to Chinese Application No. 2019114123372; 1 page.

First Office Action issued Oct. 22, 2020, in corresponding to Chinese Application No. 201911412337.2; 15 pages (with English Translation).

The Second Office Action issued Apr. 15, 2021, in corresponding to Chinese Application No. 201911412337.2; 20 pages (with English Translation).

* cited by examiner

ANODE ACTIVE MATERIAL FOR BATTERIES, AND METHOD FOR PREPARING SAME

CROSS-REFERENCE TO RELATED APPLICATION(S)

This application is a 371 application of International Application No. PCT/CN2020/140717, filed on Dec. 29, 2020, which claims priority to Chinese Patent Applications Nos. 201911406235.X and 201911412337.2, filed on Dec. 31, 2019, the contents of all of which are herein incorporated by reference in their entireties.

TECHNICAL FIELD

The invention relates to the field of batteries, in particular to an anode active material for batteries, and a method for preparing the same.

BACKGROUND

In recent years, the continuous development of various portable electronic devices and electric vehicles has put forward an increasingly urgent demand for batteries with a high energy density and a long cycle life. The anode active material of existing commercial lithium ion batteries is mainly graphite that has a low theoretical capacity (372 mAh/g), thus limiting a further improvement of the energy density of the batteries. The monatomic silicon anode active material has the advantage of a high capacity (the state of intercalated lithium at room temperature is $Li_{15}Si_4$, and the theoretical lithium storage capacity is about 3600 mAh/g), which is about ten times the theoretical capacity of the existing commercial graphite anode active material, and having a high-capacity advantage that cannot be surpassed by other anode active materials, thus having become a hotspot in research and development in recent years, and has gradually moved from the research and development in laboratories to commercial applications. At present, three types of silicon anode active materials are mainly studied and developed: composite material of monatomic silicon (including nano-silicon, porous silicon, amorphous silicon, and the like) and carbon material thereof; alloy material formed by compounding silicon with other metals (such as ferrum, manganese, nickel, chromium, cadmium, tin and copper) or non-metals (such as carbon, nitrogen, phosphorus and boron); composite material of silicon oxide and carbon material thereof. In these three structures, the monatomic silicon material has the highest theoretical capacity, thus also having the highest theoretical energy density. However, the monatomic silicon anode active material has a serious volume effect in the lithiation and delithiation process, and the rate of volume change is about 300%, which may lead to pulverization within the electrode and separation of the electrode from the current collector. In addition, the silicon anode active material may fracture ceaselessly due to continuous expansion and contraction in the battery charging and discharging process, and new interface generated in this process will be exposed to the electrolyte to form a new SEI film, so that the electrolyte will be continuously consumed, thus reducing the cycle performance of the battery. These defects severely limit the commercial application of monatomic silicon anodes.

The silicon oxide compounds contain many inactive substances, thus having a capacity lower than that of the monatomic silicon anode active material. However, due to the existence of these inactive substances, the expansion of silicon in the cycle process is effectively restrained by the inactive phase, so the silicon oxide compounds have an outstanding advantage in cycle stability. Compared with monatomic silicon, the silicon oxide compounds are more suitable for industrial application.

However, the silicon oxide compounds have the following specific problems: when lithium is initially intercalated into the material, too many side reactions occur between the surface of the particles and the electrolyte, and a thick SEI film is generated; moreover, substances that are irreversible to release lithium ions, such as lithium metasilicate and lithium oxide, are generated in the particles, thus resulting in irreversible losses of lithium ions in batteries. These two irreversible reactions reduce the initial coulombic efficiency of lithium ion batteries containing silicon oxide compound anodes, thus limiting the improvement of the energy density of the batteries. In addition, the silicon oxide compounds also have the problems of low ionic and electronic conductivity, low coulombic efficiency during the cycle process, and the like. In view of these problems, researchers make the following improvements.

Specifically, in order to improve the electrical conductivity of the silicon oxide compounds to obtain a high capacity and a better cycle performance, the surface of the silicon oxide compounds may be coated with a conductive material such as a carbon film. In order to improve the initial coulombic efficiency, lithium may be doped into the silicon oxide compounds, for example, the silicon oxide compounds and lithium are mixed at a high temperature, or lithium is doped into silicon oxide compound anodes by an electrochemical method, or the silicon oxide compounds and lithium or an organic lithium compound, serving as a lithiation agent, are subjected to an in-situ reaction when mixed by means of high-energy mechanical mixing, or a lithium-containing compound and the silicon oxide compounds are subjected to a reaction at a high temperature to dope lithium into the silicon oxide compounds. Due to the existence of the lithium-containing compound, the material is highly alkaline, thus having poor water tolerance. So, if an anode active material containing the silicon oxide lithium compound is used in the aqueous homogenization process during actual battery production, the slurry is prone to denaturation due to the high alkalinity of the material; in addition, due to the poor water tolerance of the silicon oxide lithium compound, the material is likely to react with water, thus leading to a poor quality and a low yield during the slurry coating process.

Chinese Invention Patent Application No. CN107710466A discloses an anode material containing a silicon oxide lithium compound and a method for preparing the same, wherein the surface of the silicon oxide lithium compound is coated with an amorphous composite layer prepared from a metal oxide and a metal hydroxide, thus improving the stability of aqueous homogenization. However, the amorphous composite layer is loose and not compact, which makes the aqueous homogenization system of the structure not stable enough.

SUMMARY

In view of the defects of the prior art, one objective of the invention is to provide an anode active material for batteries, which is high in capacity and coulombic efficiency, long in cycle life, good in water tolerance and suitable for an aqueous homogenization system, and a method for preparing the anode active material in large scale.

Specifically, the invention provides an anode active material for batteries, which comprises anode active substance particles, wherein the anode active substance particles contain a silicon oxide compound;

The anode active substance particles comprise lithium and a non-lithium doping metal, wherein:

The non-lithium doping metal comprises a metal M1 including one or more of titanium, magnesium, zirconium, zinc, aluminum, yttrium and calcium, and a content of the non-lithium doping metal in the anode active material is 0.01-20 wt %, preferably 0.05-15 wt %, further preferably 0.1-10 wt %, and more preferably 0.1-5 wt %.

Further, the non-lithium doping metal further comprises a metal M2 including one or more of copper, nickel, ferrum, manganese, cobalt and chromium.

Further, total contents of the metal M1 and the metal M2 in the anode active material are 0.01-25 wt %, preferably 0.05-15 wt %, further preferably 0.1-10 wt %, and more preferably 0.1-5 wt %.

Further, a content of the metal M2 in the anode active material is 0.01-25 wt %, preferably 0.01-20 wt %, even preferably 0.05-15 wt %, further preferably 0.1-10 wt %, and more preferably 0.1-5 wt %.

Specifically, the metal M1 exists in the anode active material in a form of an oxygen-containing compound, and the oxygen-containing compound of the non-lithium doping metal comprises one or more of a metal oxide, a metal silicate, a lithium-containing composite metal silicate (such as lithium magnesium silicate), and a composite oxide of lithium and a non-lithium doping metal (such as lithium zirconate).

Further, the oxygen-containing compound of the metal M1 may be dispersedly distributed in the silicon oxide compound.

Further, the oxygen-containing compound of the metal M1 may be concentrated on a surface layer of the silicon oxide compound, and specifically, concentration of the oxygen-containing compound decreases gradually from the surface layer to an interior of the silicon oxide compound.

Further, one part of the oxygen-containing compound of the metal M1 may be retained on a surface of the silicon oxide compound to form a coating structure, and the other part of the oxygen-containing compound may be diffused into silicon oxide compound particles.

Further, the metal M2 exists in the anode active material in a form of an elemental metal phase or a silicon alloy phase.

Specifically, a content of the lithium in the anode active substance particles is 0.1-20 wt %, preferably 2-18 wt %, and more preferably 4-15 wt %.

Specifically, the anode active substance particles comprise at least one lithium-containing compound selected from $Li_4SiO_4$, $Li_2SiO_3$, $Li_6Si_2O_7$, $Li_8SiO_6$ and $Li_2Si_2O_5$.

Further, a median size of the anode active substance particles is 0.2-20 μm, preferably 1-15 μm, and more preferably 2-10 μm.

Further, the anode active substance particles further comprise nano-silicon grains that are regularly dispersed in the anode active substance particles, wherein a median size of the nano-silicon grains is 0.1-35 nm, preferably 0.5-20 nm, and more preferably 1-15 nm.

Specifically, a content of silicon in the anode active substance particles is 30-80 wt %, preferably 35-65 wt %, and further preferably 40-65 wt %, so the anode active material has a high reversible capacity.

Specifically, surfaces of the anode active substance particles are coated with a carbon film covering a surface of the silicon oxide compound, and a thickness of the carbon film is 0.001-5 μm, preferably 0.005-2 μm, and further preferably 0.01-1 μm.

Specifically, a weight ratio of the carbon film and the silicon oxide compound is 0.01:100-20:100, preferably 0.1:100-15:100, and more preferably 1:100-12:100.

The invention further provides an electrode, comprising the anode active material mentioned above.

The invention further provides an electrode or a battery comprising the anode active material mentioned above.

The invention further provides a method for preparing the anode active material mentioned above. The method comprises:

Preparing silicon oxide compound particles, and doping lithium and a non-lithium metal into the silicon oxide compound particles, wherein a stoichiometric ratio of silicon and oxygen in the silicon oxide compound particles is 1:0.4-1:2, preferably 1:0.6-1:1.5, and more preferably 1:0.8-1:1.2.

Specifically, the non-lithium metal comprises a metal M1 and a metal M2, wherein the metal M1 comprises one or more of titanium, magnesium, zirconium, zinc, aluminum, yttrium and calcium; and the metal M2 comprises one or more of copper, nickel, ferrum, manganese, cobalt and chromium.

Further, in the method, a dopant source of the metal M1 may be an elemental metal or compound containing the metal M1, preferably a compound containing the metal M1, further preferably a non-reducing compound containing the metal M1, more preferably a compound containing the metal M1 and a chalcogen element (VIA group) or a halogen element (VIIA group), and even further preferably a compound containing the metal M1 and oxygen, such as an oxide, an inorganic or organic compound containing the metal M1 and oxygen; and a dopant source of the metal M2 may be an elemental metal or a compound containing the metal M2, and preferably a compound containing the metal M2.

Further, a median size of the silicon oxide compound particles is 0.2-20 μm, preferably 1-15 μm, and more preferably 2-10 μm. A doping temperature of the non-lithium metal is 400-1100° C., and preferably 600-1000° C. A doping temperature of the lithium is 400-900° C., and preferably 550-850° C.

Further, the silicon oxide compound particles are entirely or partially coated with a carbon film or not coated with a carbon film. A silicon oxide compound is not disproportionated or is disproportionated through heat treatment, wherein a temperature of the heat treatment is 600-1100° C., and preferably 700-1000° C. A carbonization temperature for coating carbon film is 600-1100° C., and preferably 700-1000° C.

Further, in the method for preparing the anode active material, the step of the non-lithium metal doping into the silicon oxide compound particles and the step of lithium-doping modification may be combined into one step, that is: the silicon oxide compound particles, non-lithium metal doping precursor and a lithium-containing compound are evenly mixed at the same time, and are then subjected to heat treatment in a non-oxidizing atmosphere. A temperature of the heat treatment is 400-900° C., and preferably 550-850° C. A holding time is 0.1-12 hrs, and a temperature rise rate is greater than 0.1° C. per minute and less than 20° C. per minute. The non-oxidizing atmosphere is provided by at least one of the following gases: nitrogen, argon, hydrogen and helium.

Preferably, in the method for preparing the anode active material, the lithium is doped into the silicon oxide compound particles after the non-lithium metal is doped and/or the carbon film is coated onto the surface of the silicon oxide compound particles.

Further, the non-lithium metal may be doped into the silicon oxide compound particles at the time when the particles are being coated with the carbon film. In addition, the step of carbon coating on the surface of the silicon oxide compound particles and the step of the non-lithium metal doping into the silicon oxide compound particles may be exchanged in order. Doping of the metal M1 and doping of the metal M2 may also be exchanged in order.

Compared with the prior art, the invention has the following advantages:

The anode active material of the invention has a compact oxygen-containing compound structure formed by the non-lithium doping metal M1. This compact oxygen-containing compound phase can greatly improve the stability of the lithium-containing silicon oxide compound and effectively isolate the interior of the particles from water, thus avoiding losses of active material caused by the reaction between the particles and water in the aqueous homogenization process; moreover, the compact oxygen-containing compound formed by the non-lithium doping metal can restrain alkali release of the lithium-containing silicon oxide compound, reduce the pH value of the material and improve the stability of aqueous slurry, thus effectively avoiding the quality problems of the anode electrodes, such as pinholes, pits, non-uniform areal density and poor adhesion with the current collector, which are caused by gas generation and deterioration of the rheological property and stability of the slurry in the coating process.

The compact oxygen-containing compound formed by the non-lithium doping metal can isolate nano-silicon grains in silicon oxide compounds from the outside electrolyte and reduce side reactions between the two, forming a more stable SEI film, so that the coulombic efficiency and capacity stability of the material can be greatly improved in the long cycle process.

The anode active material of the invention further contains the elemental metal or silicon alloy phase of the non-lithium doping metal M2. This metal phase or silicon alloy phase of M2 can effectively improve the internal electrical conductivity of the anode active substance particles, as well as the structural stability, thus improving the coulombic efficiency and cycle stability of the anode active material.

The anode active material of the invention contains the compact oxygen-containing compound formed by the non-lithium doping metal M1 and the elemental metal or the silicon alloy phase of the non-lithium doping metal M2 at the same time. So under the synergistic effect of the above two, the stability of the anode active material is greatly improved, along with the alkali release to be restrained, and the water tolerance to be remarkably enhanced; moreover, this synergistic effect also immensely increases the coulombic efficiency and capacity stability of the material in the long cycle process.

The great electrochemical properties of the lithium-containing silicon oxide compound are also preserved in the anode active material of the invention, such as high coulombic efficiency, high reversible capacity, high cycle retention rate and small cycle expansion. Thus, lithium ion batteries prepared from the material have the advantages of high energy density, good cycle stability and low expansion.

Silicon nano-grains in the lithium-containing silicon oxide compound particles have a small size and are evenly dispersed and fixed in a lithium silicate compound or silicon oxide compound matrix, which can effectively restrain and buffer the expansion of the nano-silicon grains and prevent the silicon particles from becoming larger clusters due to gradual fusion in the repeated charge-discharge process, which may otherwise cause greater expansions and fractures of the particles. Thus, a lithium ion secondary battery prepared from the anode active material provided by the application has the advantages of small cycle expansion, good cycle stability, high energy density, and the like.

To sum up, the application provides an anode active material for batteries, which has high capacity, high coulombic efficiency and good cycle performance. The battery prepared from the anode active material has the advantages of high energy density, good cycle stability and low expansion. The application also provides a method for preparing the anode active material, which is simple, low cost, good in repeatability and suitable for massive production. The anode active material is very good in water tolerance, so it can be applied easily to aqueous homogenization system, which is commonly used in industry. Thus, this anode material can truly realize the large-scale application of silicon-containing anodes in the field of secondary batteries.

DETAILED DESCRIPTION

Figure 1:
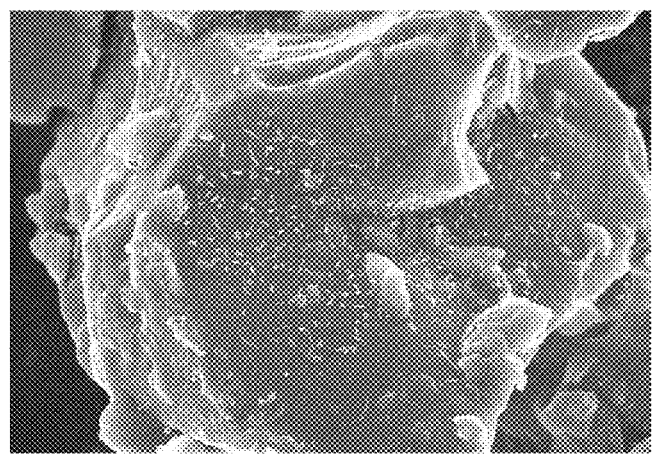
FIG. 1 is an SEM image of a product in Embodiment 1.

For the sake of a better understanding of the solutions and advantages of the invention, specific implementations of the invention will be explained in further detail below in conjunction with embodiments. Clearly, the specific implementations and embodiments below are merely for the purpose of description and are not used to limit the invention.

One objective of the invention is to overcome the defects of the prior art by providing an anode active material for batteries, which is high in capacity and coulombic efficiency, long in cycle life, good in water tolerance and suitable for aqueous homogenization system. The invention also provides a method for preparing the anode active material in large scale.

Specifically, the invention provides an anode active material for batteries, which comprises anode active substance particles containing silicon oxide compound.

The anode active substance particles comprise lithium and a non-lithium doping metal, wherein:

The non-lithium doping metal comprises a metal M1, the metal M1 comprises one or more of titanium, magnesium, zirconium, zinc, aluminum, yttrium and calcium, and the content of the non-lithium doping metal in the anode active material is 0.01-20 wt %, preferably 0.05-15 wt %, further preferably 0.1-10 wt %, and more preferably 0.1-5 wt %. The content of the non-lithium doping metal is within a suitable range, so the doping metal will not exert an adverse impact on the capacity of the anode active material and the lithium-containing silicon oxide compound can be fully stabilized and protected at the same time, thus the aqueous slurry containing the anode active material of the invention is stable enough.

Further, the non-lithium doping metal further comprises a metal M2, and the metal M2 comprises one or more of copper, nickel, ferrum, manganese, cobalt and chromium.

Further, the total contents of the metal M1 and the metal M2 in the anode active material are 0.01-25 wt %, preferably 0.05-15 wt %, further preferably 0.1-10 wt %, and more preferably 0.1-5 wt %.

Further, the content of the metal M2 in the anode active material is 0.01-25 wt %, preferably 0.01-20 wt %, even preferably 0.05-15 wt %, further preferably 0.1-10 wt %, and more preferably 0.1-5 wt %.

Further, the metal M1 may exist in the anode active material in the form of an oxygen-containing compound, and the oxygen-containing compound comprises one or more of a metal oxide, a metal silicate, a lithium-containing composite metal silicate (such as lithium magnesium silicate), and a composite oxide of lithium and a non-lithium doping metal (such as lithium zirconate). The oxygen-containing compound of metal M1 is regularly dispersed or partially concentrated in the anode active substance particles and forms a compact protective structure. The oxygen-containing compound of M1 is insoluble in water, thus its compact structure may greatly improve the stability of the lithium-containing silicon oxide compounds, and effectively isolate the interior of the particles from water or the outside electrolyte. So, it can avoid losses of the active material caused by the reaction between the particles and water in the aqueous homogenization process, and also reduce side reactions between the electrolyte and the silicon oxide compound, thus improving the initial coulombic efficiency of the material.

In addition, the compact oxygen-containing compound formed by the non-lithium doping metal M1 can restrain alkali release of the lithium-containing silicon oxide compound, reduce the pH value of the material and improve the stability of aqueous slurry, thus effectively avoiding the quality problems of the anode electrodes, such as pinholes, pits, non-uniform areal density and poor adhesion with the current collector, which are caused by gas generation and deterioration of the rheological property and stability of the slurry in the coating process.

Further, the oxygen-containing compound of the metal M1 is dispersedly distributed in the silicon oxide compound to form a compact protective structure.

Further, the oxygen-containing compound of the metal M1 is concentrated on a surface layer of the silicon oxide compound to form a compact protective shell, and the concentration of the oxygen-containing compound decreases gradually from the surface layer to an interior of the silicon oxide compound.

In the anode active substance particles, one part of the oxygen-containing compound of the metal M1 may retain on a surface of the silicon oxide compound to form a coating structure, and the other part of the oxygen-containing compound may diffuse into silicon oxide compound particles.

Further, the metal M2 exists in the anode active material in the form of an elemental metal phase or a silicon alloy phase.

The non-lithium doping metal M2 is uniformly dispersed or partially concentrated in the anode active substance particles and mainly forms an elemental metal phase or a silicon alloy phase. The elemental metal phase or the silicon alloy phase of the doping meal M2 effectively improves the internal electrical conductivity and the structural stability of the anode active substance particles, thus improving the coulombic efficiency and cycle stability of the anode active material.

Specifically, under the synergistic effect of the oxygen-containing compound of metal M1 and the elemental metal or silicon alloy phase of metal M2, a better result can be realized, so that the stability of the material can be greatly improved, along with the alkali release to be restrained, and the water tolerance to be remarkably enhanced; moreover, this synergistic effect immensely increases the coulombic efficiency and capacity stability of the material in the long cycle process.

Specifically, the content of the lithium in the anode active substance particles is 0.1-20 wt %, preferably 2-18 wt %, and more preferably 4-15 wt %.

Specifically, the anode active substance particles comprise at least one lithium-containing compound selected from $Li_4SiO_4$, $Li_2SiO_3$, $Li_6Si_2O_7$, $Li_8SiO_6$ and $Li_2Si_2O_5$. Compared with traditional anode materials containing silicon oxide compounds, by intercalating lithium ions into the silicon oxide compound, the initial coulombic efficiency and cycle performance of the material are remarkably improved.

Further, a median size of the anode active substance particles is 0.2-20 μm, preferably 1-15 μm, and more preferably 2-10 μm.

Further, the anode active substance particles further comprise nano-silicon grains that are regularly dispersed in the anode active substance particles, wherein a median size of the nano-silicon grains is 0.1-35 nm, preferably 0.5-20 nm, and more preferably 1-15 nm. By adoption of this particle size, the particles expand slightly and are not prone to fracturing when lithium ions are intercalated into or removed from the particles, so that lithium ion secondary batteries using the material possess small cyclic expansion and stable cycle performance.

Specifically, the content of silicon in the anode active substance particles is 30-80 wt %, preferably 35-65 wt %, and more preferably 40-65 wt %, so the anode active material has a high reversible capacity.

Further, surfaces of the anode active substance particles are coated with a carbon film, the carbon film covers a surface of the silicon oxide compound, and a thickness of the carbon film is 0.001-5 μm, preferably 0.005-2 μm, and more preferably 0.01-1 μm. Wherein, coating means that the carbon film completely or partially cover the surfaces of the particles. The carbon film can effectively improve the electrical conductivity of the particles, reduce the contact resistance among particles in the anode and the contact resistance between the anode and the current collector, thus improving the charge transfer efficiency of the material, reducing the polarization and promoting the cycle stability of the lithium ion batteries.

Specifically, a weight ratio of the carbon film and the silicon oxide compound is 0.01:100-20:100, preferably 0.1:100-15:100, and more preferably 1:100-12:100.

The invention further provides an electrode comprising the anode active material mentioned above.

The invention further provides an anode or battery comprising the anode active material mentioned above.

The invention further provides a method for preparing the anode active material. The method comprises:

Silicon oxide compound particles are obtained, and lithium and a non-lithium doping metal are doped into the silicon oxide compound particles, wherein a stoichiometric ratio of silicon and oxygen in the silicon oxide compound particles is 1:0.4-1:2, preferably 1:0.6-1:1.5, and more preferably 1:0.8-1:1.2.

Specifically, the non-lithium metal comprises a metal M1 and a metal M2, wherein the metal M1 comprises one or more of titanium, magnesium, zirconium, zinc, aluminum, yttrium and calcium; and the metal M2 comprises one or more of copper, nickel, ferrum, manganese, cobalt and chromium.

Further, a median size of the silicon oxide compound particles is 0.2-20 μm, preferably 1-15 μm, and more preferably 2-10 μm. A doping temperature of the non-lithium metal is 400-1100° C., and preferably 600-1000° C. A doping temperature of lithium is 400-900° C., and preferably 550-850° C.

Further, the silicon oxide compound particles are entirely or partially coated with a carbon film or not coated with a carbon film. A silicon oxide compound is not disproportionated or is disproportionated through heat treatment, wherein a temperature of the heat treatment is 600-1100° C., and preferably 700-1000° C. A carbonization temperature for coating carbon film is 600-1100° C., and preferably 700-1000° C.

Further, in the method for preparing the anode active material, the step of the non-lithium metal doping into the silicon oxide compound particles and the step of lithium-doping modification may be combined into one step, that is: the silicon oxide compound particles, non-lithium metal doping precursor and a lithium-containing compound are evenly mixed at the same time, and are then subjected to heat treatment in a non-oxidizing atmosphere. A temperature of the heat treatment is 400-900° C., and preferably 550-850° C. A holding time is 0.1-12 hrs, and a temperature rise rate is greater than 0.1° C. per minute and less than 20° C. per minute. The non-oxidizing atmosphere is provided by at least one of the following gases: nitrogen, argon, hydrogen and helium.

Preferably, in the method for preparing the anode active material, the lithium is doped into the silicon oxide compound particles after the non-lithium metal is doped and/or after the silicon oxide compound particles are coated with the carbon film The step of lithium doping is performed after the step of non-lithium metal doping, so that the growth of silicon grains in the silicon oxide compound is restrained in the heat treatment process. In this way, nano-silicon grains are uniformly dispersed and fixed in a lithium silicate compound or silicon oxide compound matrix, which can effectively restrain the expansion of the nano-silicon grains and prevent the silicon grains from becoming larger clusters due to gradual fusion in the charge and discharge process, thus reducing the expansion of batteries in the cycle process, reducing electrical failures of the silicon materials, and guaranteeing small cell expansion and good cycle stability during long cycles of the batteries using the material. Further, the non-lithium metal may be doped into the silicon oxide compound particles at the time when the particles are being coated with the carbon film. In addition, the step of carbon coating on the surfaces of the silicon oxide compound particles and the step of the non-lithium metal doping into the silicon oxide compound particles may be exchanged in order. Doping of the metal M1 and doping of the metal M2 may also be exchanged in order.

By performing the step of lithium doping after the step of carbon film coating and non-lithium element doping, the growth of silicon grains in the silicon oxide compound may be restrained in the heat treatment process. In this way, nano-silicon grains are uniformly dispersed and fixed in a lithium silicate compound or silicon oxide compound matrix, which can effectively restrain the expansion of the nano-silicon grains and prevent the silicon grains from becoming larger clusters due to gradual fusion in the charge and discharge process, thus reducing the expansion of batteries in the cycle process, reducing electrical failures of the silicon materials, and guaranteeing small cell expansion and good cycle stability during long cycles of the batteries using the material. In addition, a carbon layer with better quality and improved covering integrity can be obtained if the step of carbon coating is performed before the step of lithium doping.

The carbon film on the surfaces of the silicon oxide compound particles may be obtained through the following methods:

The carbon film layer may be directly obtained by chemical vapor deposition (CVD) with a hydrocarbon compound gas as a carbon source, and the decomposition temperature of the hydrocarbon compound gas is 600-1100° C., preferably 750-950° C. The carbon film layer may also be obtained by carrying out a carbon source coating process and then carrying out heat treatment for carbonization under a non-oxidizing atmosphere. The carbon source coating may be carried out in any one of a mechanical fusion machine, a VC mixer, a coating machine, a spray drier, a sand mill, and a high-speed disperser. A solvent used for coating is one or a combination of several of water, methyl alcohol, ethyl alcohol, isopropanol, n-butyl alcohol, ethylene glycol, diethyl ether, acetone, N-methyl pyrrolidone, methyl butanone, tetrahydrofuran, benzene, methylbenzene, xylene, N,N-dimethyl formamide, N,N-dimethylacetamide, and trichloromethane. The carbon source may be one or a combination of several of coal asphalt, petroleum asphalt, polyvinyl alcohol, epoxy resin, polyacrylonitrile, polymethyl methacrylate, glucose, sucrose, polyacrylic acid, and polyvinyl pyrrolidone. Equipment used for the heat treatment for carbonization may be any one of a rotary furnace, a ladle furnace, a roller kiln, a pushed slab kiln, a box furnace, and a tube furnace. The temperature of the heat treatment for carbonization may be 600-1100° C., and preferably 700-1000° C., and the holding time is 0.5-24 hrs. The non-oxidizing atmosphere may be provided by at least one of the following gases: nitrogen, argon, hydrogen, or helium.

Specifically, doping of the non-lithium metal may be carried out in a non-oxidizing atmosphere through heat treatment of the mixture with the silicon oxide compound particles and a non-lithium metal dopant. Herein, the non-lithium metal dopant comprises an elemental metal or compound power containing the doping element, and preferably comprises a compound containing the doping element, such as a metal oxide, a metal salt (including an inorganic metal salt such as nitrate, nitrite, sulfate, sulfite, disulfate, hydrophosphate, dihydric phosphate, haloid and other, and organic metal salts such as acetate, oxalate and citrate), and the like.

Specifically, any one of a high-speed disperser, a spray drier, a high-speed stirring mill, a ball mill, a cone-type mixer, a spiral mixer, a stirring mixer and a VC mixer may be used for mixing. Any one of a rotary furnace, a ladle furnace, a roller kiln, a pushed slab kiln, a box furnace and a tube furnace may be used for heat treatment for doping. The temperature of the heat treatment for doping is 400-1100° C., and preferably 600-1000° C. The holding time is 0.1-12 hrs and preferably 1-4 hrs, and the temperature rise rate is greater than 1° C. per minute and less than 100° C. per minute. The non-oxidizing atmosphere is provided by at least one of the following gases: nitrogen, argon, hydrogen, or helium.

Specifically, the method for lithium-doping modification is an electrochemical method, a liquid-phase doping method, a thermal doping method, a high-temperature mixing method, a high-energy mechanical method, or the like, and is preferably the electrochemical method, the liquid-phase doping method or the thermal doping method.

When the electrochemical method is used for lithium-doping modification, an electrochemical pool is provided, wherein the electrochemical pool comprises a bath, an anode, a cathode and a power source, and the anode and the cathode are connected to two terminals of the power source respectively. The anode is connected to a lithium source, and the cathode is connected to a container containing silicon oxide compound particles. The bath is filled with an organic solvent, and the lithium source and the container containing the silicon oxide compound particles are immersed in the organic solvent. After the power source is turned on, lithium ions are doped into the silicon oxide compound structure under the effect of an electrochemical reaction, so that silicon oxide compound particles modified by lithium doping are obtained. The organic solvent may be ethylene carbonate, propylene carbonate, butylenes carbonate, fluoroethylene carbonate, dimethyl carbonate, methyl ethyl carbonate, diethyl carbonate, ethyl acetate, propyl acetate, ethyl propionate, propyl propionate, dimethyl sulfoxide, or the like. In addition, the organic solvent contains lithium salt, which may be lithium hexafluorophosphate ($LiPF_6$), lithium tetrafluoroborate ($LiBF_4$), lithium perchlorate ($LiClO_4$), or the like. The lithium source may be lithium foil, or a lithium compound such as lithium carbonate, lithium oxide, lithium hydroxide, lithium cobalt oxide, lithium iron phosphate, lithium manganate, lithium vanadium phosphate and lithium nickel oxide.

In addition, the liquid-phase doping method may be used for lithium-doping modification of the silicon oxide compound. Specifically, lithium, an electron transfer catalyst, and silicon oxide compound particles are added to an ether solvent, continuously stirred in a non-oxidizing atmosphere, and heated to maintain a thermostatic reaction until the lithium disappears completely. Under the effect of the electron transfer catalyst, the lithium is dissolved in the ether solvent to form a coordination compound of lithium ions, which has a low reduction potential and can react with the silicon oxide compound, so the lithium ions enter into the silicon oxide compound. The electron transfer catalyst comprises biphenyl, naphthalene, and the like. The ether solvent comprises methyl butyl ether, ethylene glycol monobutyl ether, tetrahydrofuran, glycol dimethyl ether, and the like. The temperature of the thermostatic reaction is 25-200° C. The non-oxidizing atmosphere is provided by at least one of the following gases: nitrogen, argon, hydrogen, and helium.

Moreover, the thermal doping method may be used for lithium-doping modification of the silicon oxide compound. Specifically, silicon oxide compound particles and a lithium-containing compound are evenly mixed, and then subjected to heat treatment under a non-oxidizing atmosphere. The lithium-containing compound comprises lithium hydroxide, lithium carbonate, lithium oxide, lithium peroxide, lithium hydride, lithium nitrate, lithium acetate, lithium oxalate, and the like. Any one of a high-speed disperser, a high-speed stirring mill, a ball mill, a cone-type mixer, a spiral mixer, a stirring mixer and a VC mixer is used for mixing. Any one of a rotary furnace, a ladle furnace, a liner furnace, a roller kiln, a pushed slab kiln, a box furnace and a tube furnace is used for heat treatment. The temperature of heat treatment is 400-900° C. and preferably 550-850° C., the holding time is 0.1-12 hrs, and the temperature rise rate is greater than 0.1° C. per minute and less than 20° C. per minute. The non-oxidizing atmosphere is provided by at least one of the following gases: nitrogen, argon, hydrogen, and helium.

Embodiment 1

1000 g of silicon oxide compound particles with a median size of 4 μm (the atomic ratio of silicon to oxygen was 1:1), 213.3 g of tetrabutyl titanate and 25 g of polyvinylpyrrolidone (PVP) were dispersed in 3000 g of deionized water at a high speed, and the slurry was spray dried. Then, the obtained powder was heated at 850° C. for 3 hrs under a nitrogen atmosphere and was then crushed with airflow. The SEM images and EDS results indicated that silicon oxide compound powder doped with titanium and partially coated with a carbon film was obtained. A small part of the titanium-containing compound was left on the surfaces of the particles forming a dot coating structure, and most of the titanium was doped into the silicon oxide compound particles (as shown in FIG. 1). The EDS result indicated that titanium was uniformly distributed on the silicon oxide compound particles.

In a drying room with the relative humidity less than 30%, 500 g of the powder obtained in the previous step, 45 g of lithium strips, and 10 g of biphenyl were added into a sealable glass container, and then 1000 g of methyl butyl ether and a big stirring magneton were added. At this moment, the container was filled with argon and was then sealed, and the container was placed on a magnetic stirrer for stirring, wherein the rotational speed was set to 200 r/min. After the material reacted at a constant temperature of 70° C. for 5 hrs, the methyl butyl ether in the container was removed by evaporation or filtering, and then drying was carried out; then, the obtained powder was placed in a tube furnace and was heated to 550° C. at a rate of 10° C./min and maintained at this temperature for 3 hrs in argon atmosphere; and finally, lithium-containing silicon oxide compound powder was obtained after natural cooling.

The obtained particles were mixed with deionized water to obtain a dispersion, and the pH of the dispersion was 10.7, which was tested by a precision pH tester from OHAUS Instrument (Shanghai) Co., Ltd.

Based on the full width at half maximum of the Si (111) diffraction peak obtained by X-ray diffraction and the Scherrer formula, the grain size of silicon in the obtained material in this embodiment was 1.2 nm.

12 parts of the anode active material, 83 parts of artificial graphite, 2.5 parts of a conductive additive, and 2.5 parts of a binder were homogenized under an aqueous system to obtain a uniform slurry. Part of the slurry was used for water-tolerance test, the other was coated on copper foil, followed by a drying and calendaring process to obtain a silicon-containing anode.

The stability of aqueous slurry containing the silicon oxide compound material was evaluated as follows: 30 g of the aqueous slurry was preserved at 65° C., and the time when the slurry started to generate gas under this condition was determined. In this severe condition, the slurry containing the anode active material in this embodiment did not generate gas over one week. In a common aqueous homogenizing process, the temperature of slurry is generally maintained at 25-30° C. So, the strict high temperature adopted in this application for evaluation of slurry stability has far exceeded the condition of an actual aqueous homogenizing and coating process. Under this evaluation method, if the slurry does not generate gas within 24 hrs, it indicates that the anode active material in the slurry is well-performed and stable in water tolerance and can be used for large-scale aqueous homogenizing.

Half-cell evaluation: the negative electrode containing the anode active material in this application, a separator, a lithium foil and a stainless-steel gasket were sequentially stacked, 200 µL of electrolyte was dropwise, and then they were sealed to get a 2016 lithium-ion coin cell. The capacity and coulombic efficiency of the half-cell were tested by using a battery testing system from Wuhan LANHE Electronics Co., Ltd. By testing, the initial reversible specific capacity was 550.7 mAh/g, and the initial coulombic efficiency (cut-off potential of lithium removal was 0.8V) was 88%.

Figure 2:
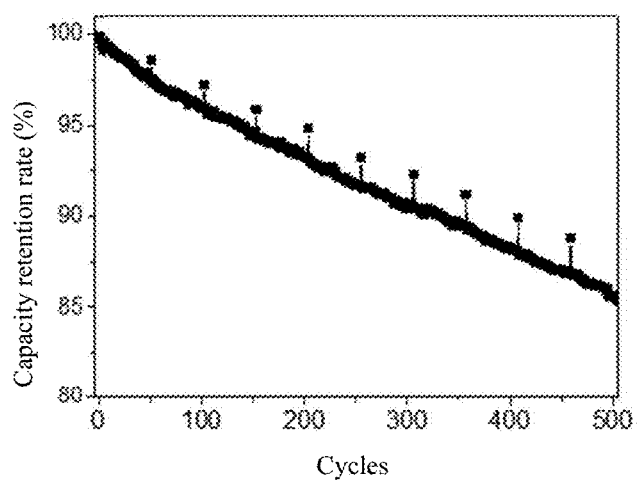
FIG. 2 is a diagram of the full-cell cycle performance of a silicon-containing anode prepared in Embodiment 1.

Full-cell evaluation: the negative electrode with the anode active material in this application was cut, vacuum-baked, and then wound and packed with a positive electrode and a separator into an aluminum-plastic case of a corresponding size; then a certain amount of electrolyte was added and sealed for formation, thereby obtaining a 3.2 Ah lithium-ion full cell. The capacity and average voltage of the full cell under 0.2C rate were tested by using a battery tester from Shenzhen Neware Technology Limited. The cell was charged and discharged for 500 cycles under a 0.7C rate to obtain the capacity retention rate. The volume energy density of the full cell was 771.5 Wh/L, and the capacity retention after 500 cycles was 85.4%. FIG. 2 is a diagram of the cycle performance of the full-cell including the silicon-containing anode prepared in Embodiment 1. The expansion rate of the full cell after 500 cycles was 11%.

Embodiment 2

Figure 3:
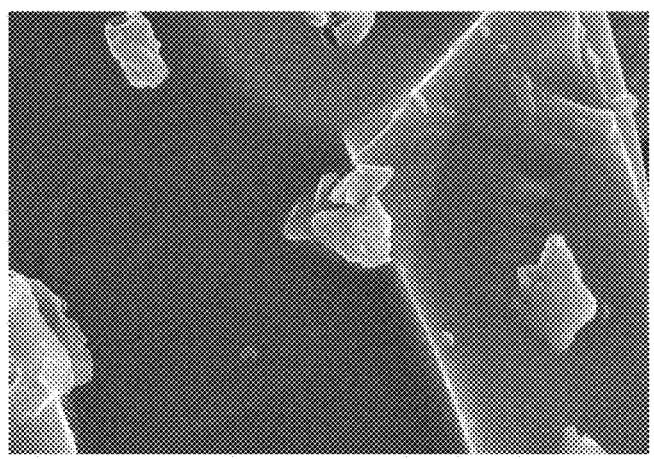
FIG. 3 is an SEM image of a product in Embodiment 2.

Compared with Embodiment 1, the silicon oxide compound particles were coated with a carbon film through the chemical vapor deposition method in Embodiment 2. By carrying out a coating reaction at 900° C. for 3 hrs with acetylene as a carbon source, the silicon oxide compound particles were coated with a complete carbon film. Then, 1000 g of the silicon oxide compound particles were uniformly coated with 11.4 g of nano-alumina through a dry coating method, and they were maintained at 800° C. for 3 hrs under a nitrogen atmosphere, so that a silicon oxide compound doped with aluminum and coated with the complete carbon film was obtained. The SEM image showed that there was no aluminum-containing compound on the surfaces of the particles, which indicated that all aluminum has been doped into the silicon oxide compound (FIG. 3). Next, lithium was doped into the silicon oxide compound through the same process in Embodiment 1, so that a lithium-containing silicon oxide compound doped with aluminum and coated with carbon film was obtained.

The pH of the obtained material was 10.9, the corresponding grain size of silicon was 2.3 nm, and the aqueous slurry containing the material did not generate gas in more than one week during an acceleration test at 65° C. The reversible specific capacity of the half cell including the anode active material was 546.6 mAh/g, and the initial coulombic efficiency was 88.5%. The volume energy density of the full cell reached 774.2 Wh/L, and the capacity retention after 500 cycles was 88.7%, with an expansion rate of 10.5% after 500 cycles.

Embodiment 3

Compared with Embodiment 1, 1000 g of silicon oxide compound particles were uniformly coated with 49.8 g of nano-zinc oxide through a dry coating method in Embodiment 3, and then they were maintained at 1000° C. for 1 h under a nitrogen atmosphere, so that silicon oxide compound powder doped with zinc and not coated with a carbon film was obtained. The SEM image showed that there was no zinc-containing compound on the surfaces of the particles, which indicated that all zinc has been doped into the silicon oxide compound. An EDS result showed that the zinc content in the surface of the particles was as high as 4.1%, which was close to the actual doping content of zinc in the silicon oxide compound, indicating that zinc was not concentrated on the surface layer of the particles. Next, lithium was doped into the silicon oxide compound through an electrochemical lithium doping method, so that a lithium-containing silicon oxide compound doped with zinc was obtained.

The pH of the obtained material was 10.1, the corresponding grain size of silicon was 3.2 nm, and aqueous slurry containing the material did not generate gas in more than one week during an acceleration test at 65° C. By testing, the reversible specific capacity of a half cell containing the silicon anode active material was 542.3 mAh/g, and the initial coulombic efficiency was 87.6%. The volume energy density of a full cell reached 764.3 Wh/L, the capacity retention rate after 500 cycles was 84%, and the expansion rate after 500 cycles was 11.3%.

Embodiment 4

Compared with Embodiment 3, the same zinc doping method and the same heat treatment process were adopted in Embodiment 4, but the quantity of the nano-zinc oxide was reduced to 12.5 g, so that silicon oxide compound particles doped with zinc were obtained. Next, the particles were coated with a carbon film through the chemical vapor deposition method by carrying out a coating reaction at 1000° C. for 3 hrs with acetylene as a carbon source, so that silicon oxide compound particles coated with a complete carbon film and doped with zinc were obtained. Next, lithium doping was carried out through the same lithium doping process in Embodiment 3, so that a lithium-containing silicon oxide compound doped with zinc and coated with carbon film was obtained.

The pH of the obtained material was 10.4, the corresponding grain size of silicon was 3.2 nm, and aqueous slurry containing the material did not generate gas in more than one week during an acceleration test at 65° C. By testing, the reversible specific capacity of a half cell containing the silicon anode active material was 543 mAh/g, and the initial coulombic efficiency was 88%. The volume energy density of a full cell reached 768.1 Wh/L, the capacity retention rate after 500 cycles was 87.1%, and the expansion rate after 500 cycles was 10.3%.

Embodiment 5

Compared with Embodiment 1, silicon oxide compound particles were coated with a carbon precursor through a liquid-phase coating method in Embodiment 5. After 1000 g of silicon oxide compound particles and 50 g of low-temperature coal asphalt powder were evenly mixed in a coating machine through a dry method, 2000 g of dimethylformamide was added during stirring, and the mixed powders were uniformly dispersed in the dimethylformamide. Then, the coating machine was heated to 140° C. and then maintained at this temperature for 3 hrs, and finally, the coating machine was heated to 160° C. and maintained at this temperature until the dimethylformamide was desiccated, so that a silicon oxide compound material coated with coal asphalt was obtained. The material was heated to 950° C. under a nitrogen atmosphere and was maintained at this temperature for 3 hrs to be carbonized. After cooling down, the material was screened with a 500-mesh screen to obtain silicon oxide compound powder coated with a carbon film. Then, a spray-drying process the same as that in Embodiment 1 was adopted, the dopant source (tetrabutyl titanate) was replaced with 22 g of magnesium acetate tetrahydrate, and the powder obtained by spray-drying was heated at 750° C. for 3 hrs, so that silicon oxide compound particles doped with magnesium and coated with a carbon film were obtained. The SEM image showed that no magnesium compound was left on the surfaces of the particles, which indicates that all magnesium was doped into the silicon oxide compound. An EDS result showed that the magnesium content in the surfaces of the particles was as high as 1%, which was far greater than the actual doping content of magnesium in the silicon oxide compound, indicating that magnesium was concentrated on the surface layer of the particles. Next, lithium doping was carried out through a thermal doping method. Specifically, 500 g of the particles and 28.5 g of lithium hydride were mixed, and then the mixed powder was placed in a tube furnace to be subjected to heat treatment under an argon atmosphere. The temperature was increased to 550° C. at a temperature rise rate of 10° C./min and then was maintained for 6 hrs. The material was taken out of the tube furnace after natural cooling, and was screened with a 500-mesh screen, so that lithium-containing silicon oxide compound doped with magnesium and coated with the carbon film was obtained.

The pH of the obtained material was 9.3, the corresponding grain size of silicon was 2.7 nm, and aqueous slurry containing the material did not generate gas in more than one week during an acceleration test at 65° C. By testing, the reversible specific capacity of a half cell containing the silicon anode active material was 560.7 mAh/g, and the initial coulombic efficiency was 86.1%. The volume energy density of a full cell reached 758.8 Wh/L, the capacity retention rate after 500 cycles was 89%, and the expansion rate after 500 cycles was 9.7%.

Embodiment 6

Compared with Embodiment 5, a similar carbon film coating process was adopted in Embodiment 6, where the temperature was adjusted to 1000° C. and maintained for 2.5 hrs in the heat treatment process. A spray-drying process the same as that in Embodiment 5 was adopted, the dopant source was replaced with 13.9 g of aluminum nitrate nonahydrate, and powder obtained by spray-drying was heated at 600° C. for 2 hrs, so that silicon oxide compound particle doped with aluminum and coated with a carbon film was obtained. Next, lithium doping was carried out through a thermal doping method, the quantity of lithium hydride was adjusted to 51.3 g, and the temperature was adjusted to 575° C. and maintained for 6 hrs in the heat treatment process, so that a lithium-containing silicon oxide compound doped with aluminum and coated with the carbon film was obtained.

The pH of the obtained material was 10.9, the corresponding grain size of silicon was 3.1 nm, and aqueous slurry containing the material did not generate gas in 72 hrs during an acceleration test at 65° C. By testing, the reversible specific capacity of a half cell containing the silicon anode active material was 536.9 mAh/g, and the initial coulombic efficiency was 89.1%. The volume energy density of a full cell reached 778.2 Wh/L, the capacity retention rate after 500 cycles was 87.2%, and the expansion rate after 500 cycles was 10.8%.

Embodiment 7

Compared with Embodiment 5, silicon oxide compound particles with a median size of 1 μm were used in Embodiment 7, a similar carbon film coating process was adopted, and the temperature was adjusted to 700° C. and maintained for 6 hrs in the heat treatment process; a spray-drying process the same as that in Embodiment 5 was adopted, the quantity of added magnesium acetate tetrahydrate was adjusted to 220 g, powder obtained by spray-drying was heated at 700° C. for 6 hrs, so that silicon oxide compound particles doped with magnesium and coated with a carbon film were obtained. Next, lithium doping was carried out through a thermal doping method, the quantity of lithium hydride was adjusted to 74.1 g, and the temperature was adjusted to 650° C. and maintained for 5 hrs in the heat treatment process, so that a lithium-containing silicon oxide compound doped with magnesium and coated with the carbon film was obtained.

The pH of the obtained material was 10.9, the corresponding grain size of silicon was 4.1 nm, and aqueous slurry containing the material did not generate gas in more than one week during an acceleration test at 65° C. By testing, the reversible specific capacity of a half cell containing the silicon anode active material was 524.2 mAh/g, and the initial coulombic efficiency was 89.8%. The volume energy density of a full cell reached 777.2 Wh/L, the capacity retention rate after 500 cycles was 83.1%, and the expansion rate after 500 cycles was 10.8%.

Embodiment 8

Compared with Embodiment 5, silicon oxide compound particles with a median size of 9 μm were adopted in Embodiment 8, the same carbon film coating process and the same spray-drying process were adopted, the dopant source was replaced with 71.1 g of tetrabutyl titanate and 44 g of magnesium acetate tetrahydrate, and powder obtained by spray-drying was heated at 900° C. for 3 hrs, so that silicon oxide compound particles doped with titanium and magnesium and coated with a carbon film were obtained. Next, lithium doping was carried out through a thermal doping method, the quantity of lithium hydride was adjusted to 45.6 g, and the temperature was adjusted to 700° C. and maintained for 5 hrs in the heat treatment process, so that a lithium-containing silicon oxide compound doped with titanium and magnesium and coated with the carbon film was obtained.

The pH of the obtained material was 10, the corresponding grain size of silicon was 3.7 nm, and aqueous slurry containing the material did not generate gas in more than one week during an acceleration test at 65° C. By testing, the reversible specific capacity of a half cell containing the silicon anode active material was 528 mAh/g, and the initial coulombic efficiency was 90.9%. The volume energy density of a full cell reached 787.1 Wh/L, the capacity retention rate after 500 cycles was 86.4%, and the expansion rate after 500 cycles was 11.9%.

Embodiment 9

Compared with Embodiment 8, silicon oxide compound particles with a median size of 15 μm were adopted in Embodiment 9, and the same carbon film coating process was adopted, so that silicon oxide compound powder coated with a carbon film was obtained. Next, the particles were uniformly coated with 27 g of nano-zirconia, and the particles were maintained at 1000° C. for 2 hrs under a nitrogen atmosphere, so that silicon oxide compound powder doped with zirconium and coated with a carbon film was obtained. Next, lithium doping was carried out through the same lithium doping process, so that a lithium-containing silicon oxide compound doped with zirconium and coated with the carbon film was obtained.

The pH of the obtained material was 9.9, the corresponding grain size of silicon was 3.8 nm, and aqueous slurry containing the material did not generate gas in more than one week during an acceleration test at 65° C. By testing, the reversible specific capacity of a half cell containing the silicon anode active material was 527 mAh/g, and the initial coulombic efficiency was 91.1%. The volume energy density of a full cell reached 788.4 Wh/L, the capacity retention rate after 500 cycles was 82.1%, and the expansion rate after 500 cycles was 12.5%.

Embodiment 10

Compared with Embodiment 6, a similar carbon film coating process was adopted in Embodiment 10, the quantity of added asphalt was adjusted to 70 g. A spray-drying process the same as that in Embodiment 6 was adopted, the dopant source was replaced with 11.4 g of zinc nitrate hexahydrate and 34.7 g of aluminum nitrate nonahydrate, and powder obtained by spray-drying was heated at 700° C. for 3 hrs, so that silicon oxide compound particles doped with zinc and aluminum and coated with a carbon film were obtained. Next, lithium doping was carried out through a thermal doping method. The quantity of lithium hydride was adjusted to 57 g, and the temperature was adjusted to 600° C. and maintained for 6 hrs in the heat treatment process, so that a lithium-containing silicon oxide compound doped with zinc and aluminum and coated with the carbon film was obtained.

The pH of the obtained material was 10.7, the corresponding grain size of silicon was 3.2 nm, and aqueous slurry containing the material did not generate gas in more than one week during an acceleration test at 65° C. By testing, the reversible specific capacity of a half cell containing the silicon anode active material was 530.4 mAh/g, and the initial coulombic efficiency was 89.9%. The volume energy density of a full cell reached 781.9 Wh/L, the capacity retention rate after 500 cycles was 86.8%, and the expansion rate after 500 cycles was 11.1%.

Embodiment 11

Compared with Embodiment 10, a similar carbon film coating process was adopted in Embodiment 11, while the quantity of added asphalt was adjusted to 100 g. A spray-drying process the same as that in Embodiment 10 was adopted, the dopant source was replaced with 208.4 g of aluminum nitrate nonahydrate, and powder obtained by spray-drying was heated at 900° C. for 2 hrs, so that silicon oxide compound particles doped with aluminum and coated with a carbon film were obtained. Next, lithium doping was carried out through a thermal doping method, and the temperature was adjusted to 700° C. and maintained for 6 hrs in the heat treatment process, so that a lithium-containing silicon oxide compound doped with aluminum and coated with the carbon film was obtained.

The pH of the obtained material was 10.2, the corresponding grain size of silicon was 4.2 nm, and aqueous slurry containing the material did not generate gas in more than one week during an acceleration test at 65° C. By testing, the reversible specific capacity of a half cell containing the silicon anode active material was 521.3 mAh/g, and the initial coulombic efficiency was 91.4%. The volume energy density of a full cell reached 793.5 Wh/L, the capacity retention rate after 500 cycles was 86.1%, and the expansion rate after 500 cycles was 11.9%.

Embodiment 12

Compared with Embodiment 6, the same carbon film coating process and the same spray-drying process were adopted in Embodiment 12, the dopant source was replaced with 353 g of magnesium acetate tetrahydrate and 182 g of zinc nitrate hexahydrate, and powder obtained by spray-drying was heated at 1000° C. for 3 hrs, so that silicon oxide compound particles doped with magnesium and zinc and coated with a carbon film were obtained. Next, lithium doping was carried out through a thermal doping method, the quantity of lithium hydride was adjusted to 34.3 g, and the temperature was adjusted to 850° C. and maintained for 2 hrs in the heat treatment process, so that a lithium-containing silicon oxide compound doped with magnesium and zinc and coated with the carbon film was obtained.

The pH of the obtained material was 8.7, the corresponding grain size of silicon was 10.2 nm, and aqueous slurry containing the material did not generate gas in more than one week during an acceleration test at 65° C. By testing, the reversible specific capacity of a half cell containing the silicon anode active material was 486 mAh/g, and the initial coulombic efficiency was 92%. The volume energy density of a full cell reached 765.3 Wh/L, the capacity retention rate after 500 cycles was 82.1%, and the expansion rate after 500 cycles was 13.5%.

Embodiment 13

Compared with Embodiment 12, the same carbon film coating process, the same spray-drying process and the same lithium doping process were adopted in Embodiment 13, and the dopant source was replaced with 706 g of magnesium acetate tetrahydrate and 364 g of zinc nitrate hexahydrate, so that a lithium-containing silicon oxide compound doped with magnesium and zinc and coated with a carbon film was obtained.

The pH of the obtained material was 8.5, the corresponding grain size of silicon was 16 nm, and aqueous slurry containing the material did not generate gas in more than one week during an acceleration test at 65° C. By testing, the reversible specific capacity of a half cell containing the silicon anode active material was 452 mAh/g, and the initial coulombic efficiency was 92%. The volume energy density of a full cell reached 739.3 Wh/L, the capacity retention rate after 500 cycles was 80.5%, and the expansion rate after 500 cycles was 15%.

Embodiment 14

Compared with Embodiment 5, the same carbon film coating process, the same spray-drying process and the same lithium doping process were adopted in Embodiment 14, and the dopant source was replaced with 4.4 g of magnesium acetate tetrahydrate, so that a lithium-containing silicon oxide compound doped with magnesium and coated with a carbon film was obtained.

The pH of the obtained material was 9.5, the corresponding grain size of silicon was 2.7 nm, and aqueous slurry containing the material did not generate gas in 24 hrs during an acceleration test at 65° C. By testing, the reversible specific capacity of a half cell containing the silicon anode active material was 562 mAh/g, and the initial coulombic efficiency was 86.1%. The volume energy density of a full cell reached 758.8 Wh/L, the capacity retention rate after 500 cycles was 89%, and the expansion rate after 500 cycles was 9.7%.

Embodiment 15

1000 g of silicon oxide compound particles with a median size of 4 μm (the atomic ratio of silicon to oxygen was 1:1) were mixed with 100 g of lithium hydride, lithium doping was carried out through a thermal doping method, and heat treatment was carried out at the temperature of 800° C. for 2 hrs, so that a lithium-containing silicon oxide compound was obtained. Then, 500 g of the particles were mixed with 25 g of magnesium powder, and were maintained at 850° C. for 1.5 hrs under an argon atmosphere, so that lithium-containing silicon oxide compound particles doped with magnesium were obtained. Finally, the particles were coated with a carbon film through a chemical vapor deposition method by carrying out a coating reaction at 850° C. for 1 h with acetylene as a carbon source, so that lithium-containing silicon oxide compound particles coated with a carbon film and doped with magnesium were obtained.

The pH of the obtained material was 9.5, the corresponding grain size of silicon was 26 nm, and aqueous slurry containing the material did not generate gas in more than one week during an acceleration test at 65° C. By testing, the reversible specific capacity of a half cell containing the silicon anode active material was 462.6 mAh/g, and the initial coulombic efficiency was 92.6%. The volume energy density of a full cell reached 730.8 Wh/L, the capacity retention rate after 500 cycles was 76.1%, and the expansion rate after 500 cycles was 17.8%.

Embodiment 16

1000 g of silicon oxide compound particles with a median size of 5 μm (the atomic ratio of silicon to oxygen was 1:1), 10 g of nano-zirconia and 70 g of low-temperature coal asphalt powder were evenly mixed in a coating machine through a dry method, 2000 g of dimethylformamide was added during stirring, and the mixed powder was uniformly dispersed in the dimethylformamide Then, the coating machine was heated to 140° C. and maintained at this temperature for stirring for 3 hrs, and finally, it was heated to 160° C. and maintained at this temperature until the dimethylformamide was desiccated, so that a silicon oxide compound material coated with coal asphalt was obtained. The obtained material was heated to 900° C. under a nitrogen atmosphere and maintained at this temperature for 4 hrs to carbonize the coal asphalt. After being cooled, the material was screened with a 500-mesh screen. The SEM image and EDS results indicated that silicon oxide compound powder coated with a carbon film and doped with zirconium was obtained. There was no zirconium compound left on the surface of the particles, which indicated that zirconium was doped into the silicon oxide compound. Moreover, the EDS result showed that the zirconium content in the surface of the particles was as high as 2.5 wt %, which was far higher than the actual doping content of zirconium in the silicon oxide compound, indicating that zirconium was concentrated on the surface layer of the particles.

Figure 4:
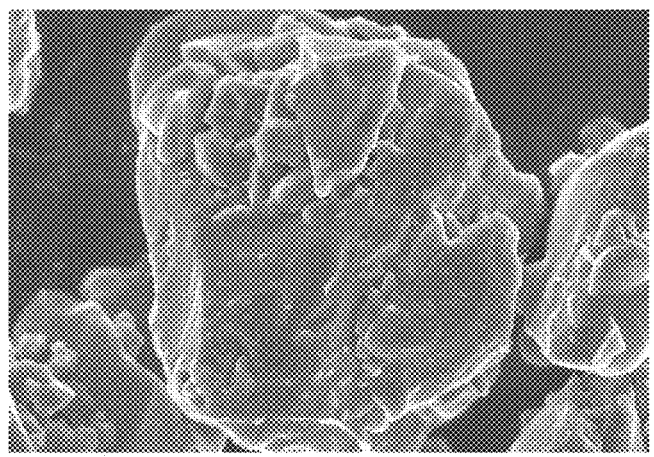
FIG. 4 is an SEM image of a product in Embodiment 16.

1000 g of the powder obtained in the previous step, 15.7 g of copper (II) acetate monohydrate and 25 g of polyvinylpyrrolidone (PVP) were dispersed in 3000 g of deionized water at a high speed, and the slurry was spray dried. Then, the obtained powder was heated at 800° C. for 3 hrs under a nitrogen atmosphere and was then crushed with an airflow. The SEM image and EDS results showed that a silicon oxide compound doped with copper and zirconium was obtained (as shown in FIG. 4).

In a drying room with the relative humidity less than 30%, 500 g of the powder obtained in the previous step, 45 g of lithium strips, and 10 g of biphenyl were added into a sealable glass container, and then 1000 g of methyl butyl ether and a big stirring magneton were added. At this moment, the container was filled with argon and was then sealed, and the container was placed on a magnetic stirrer for stirring, wherein the rotational speed was set to 200 r/min After the material reacted at a constant temperature of 70° C. for 5 hrs, the methyl butyl ether in the container was removed by evaporation or filtering, and then drying was carried out; then, the obtained powder was placed in a tube furnace and was heated to 550° C. at a rate of 10° C./min and maintained at this temperature for 3 hrs in an argon atmosphere; and finally, lithium-containing silicon oxide compound powder was obtained after natural cooling.

The obtained particles were mixed with deionized water to obtain a dispersion, and the pH of the dispersion was 10.9, which was tested by a precision pH tester from OHAUS Instrument (Shanghai) Co., Ltd.

The electrical resistivity of the obtained particles was tested with a powder resistivity tester, and the electrical resistivity was 24 Ω*cm under a pressure of 20 MPa.

In addition, an X-Ray diffraction result indicated that the obtained material had a small quantity of zirconium silicate phase and copper-silicon alloy phase. Meanwhile, based on the full width at half maximum of the Si (111) diffraction peak and the Scherrer formula, the grain size of silicon in the obtained material was 2.3 nm.

12 parts of the anode active material, 83 parts of artificial graphite, 2.5 parts of a conductive additive, and 2.5 parts of a binder were homogenized under an aqueous system to obtain a uniform slurry. Part of the slurry was used for water-tolerance test, the other was coated on copper foil, followed by a drying and calendaring process to obtain a silicon-containing anode.

The stability of aqueous slurry containing the silicon oxide compound material was evaluated as follows: 30 g of the aqueous slurry was preserved at 65° C., and the time when the slurry started to generate gas under this condition was determined. In this severe condition, the slurry containing the anode active material in this embodiment did not generate gas over one week. In a common aqueous homogenizing process, the temperature of the slurry is generally maintained at 25-30° C. So, the strict high temperature adopted in this patent for evaluation of slurry stability has far exceeded the condition of an actual aqueous homogenizing and coating process. Under this evaluation method, if the slurry does not generate gas within 24 hrs, it indicates that the anode active material in the slurry is well-performed and stable in water tolerance and can be used for large-scale aqueous homogenizing.

Half-cell evaluation: the negative electrode containing the anode active material in this application, a separator, a lithium foil and a stainless-steel gasket were sequentially stacked, 200 μL of electrolyte was dropwise, and then they were sealed to get a 2016 lithium-ion coin cell. The capacity and coulombic efficiency of the half-cell were tested by using a battery testing system from Wuhan LANHE Electronics Co., Ltd. By testing, the initial reversible specific capacity was 546 mAh/g, and the initial coulombic efficiency (cut-off potential of lithium removal was 0.8V) was 88.4%.

Full-cell evaluation: the negative electrode with the anode active material in this application was cut, vacuum-baked, and then wound and packed with a positive electrode and a separator into an aluminum-plastic bag of a corresponding size; then a certain amount of electrolyte was added and sealed for formation, thereby obtaining a complete 3.2 Ah lithium-ion full cell. The capacity and average voltage of the full cell under 0.2C rate were tested by using a battery tester from Shenzhen Neware Technology Limited. The cell was charged and discharged for 500 cycles under a 0.7 C rate to obtain the capacity retention rate. The volume energy density of the full cell was 773 Wh/L, and the capacity retention after 500 cycles was 88%. The expansion rate of the full cell after 500 cycles was 10.5%.

Embodiment 17

Compared with Embodiment 16, the silicon oxide compound was not coated with a carbon film in Embodiment 17. 1000 g of silicon oxide compound particles were uniformly coated with 20 g of nano-zinc oxide and 25.5 g of nano-nickel oxide directly through a dry method, and they were maintained at 950° C. for 3 hrs under a nitrogen atmosphere, so that a silicon oxide compound doped with zinc and nickel was obtained. Next, the silicon oxide compound was doped with lithium through an electrochemical lithium intercalating method, so that a lithium-containing silicon oxide compound doped with zinc and nickel was obtained.

An obtained silicon anode active material had a zinc silicate phase and a nickel-silicon alloy phase. The pH of the material was 10.2, the corresponding grain size of silicon was 2.7 nm, and aqueous slurry containing the material did not generate gas in more than one week during an acceleration test at 65° C. By testing, the reversible specific capacity of a half cell containing the silicon anode active material was 542.3 mAh/g, and the initial coulombic efficiency was 87.6%. The volume energy density of a full cell reached 764.3 Wh/L, the capacity retention rate after 500 cycles was 84%, and the expansion rate after 500 cycles was 11.3%.

Embodiment 18

Compared with Embodiment 16, the asphalt content was decreased to 50 g in Embodiment 18, and the temperature was adjusted to 1000° C. and maintained for 2 hrs for carbon film coating, so that silicon oxide compound particles coated with a carbon film were obtained. Next, 1000 g of silicon oxide compound particles were uniformly coated with 1.9 g of nano-alumina and 1.3 g of nano-manganese oxide through a dry coating method, and then the particles were maintained at 700° C. for 3 hrs under a nitrogen atmosphere, so that a silicon oxide compound doped with aluminum and manganese and coated with a carbon film was obtained. Next, lithium doping was carried out through a thermal doping method. Specifically, 500 g of silicon oxide compound particles were mixed with 57 g of lithium hydride. The mixed powder was placed in a tube furnace and was heated to 600° C. at a rate of 10° C./min and maintained at this temperature for 6 hrs under an argon atmosphere. After cooling down, the material was taken out of the tube furnace and screened with a 500-mesh screen, so that a lithium-containing silicon oxide compound doped with aluminum and manganese and coated with the carbon film was obtained.

The pH of the obtained material was 10.8, the corresponding grain size of silicon was 3.2 nm, and aqueous slurry containing the material did not generate gas in more than one week during an acceleration test at 65° C. By testing, the reversible specific capacity of a half cell containing the silicon anode active material was 534 mAh/g, and the initial coulombic efficiency was 89.9%. The volume energy density of a full cell reached 781 Wh/L, the capacity retention rate after 500 cycles was 86.8%, and the expansion rate after 500 cycles was 11.1%.

Embodiment 19

Compared with Embodiment 16, silicon oxide compound particles with a median size of 1 μm were adopted in Embodiment 19. A carbon film coating process similar to that in Embodiment 1 was adopted, while the asphalt content was decreased to 50 g, and the temperature for heat treatment of carbon film coating was adjusted to 950° C. and maintained for 3 hrs, so that silicon oxide compound particles coated with a carbon film were obtained. Next, a spray-drying process similar to that in Embodiment 1 was adopted, the dopant source was replaced with 284.4 g of tetrabutyl titanate and 289.4 g of ferric nitrate nonahydrate, and powder obtained by spray-drying was heated at 800° C. for 6 hrs, so that silicon oxide compound particles doped with titanium and ferrum and coated with the carbon film was obtained. Next, lithium doping was carried out through a thermal doping method. Specifically, 500 g of the silicon oxide compound particles were mixed with 74.1 g of lithium hydride. The mixed powder was placed in a tube furnace and was heated to 650° C. at a rate of 10° C./min and maintained at this temperature for 5 hrs under an argon atmosphere. After cooling down, the material was taken out of the tube furnace and screened with a 500-mesh screen, so that a lithium-containing silicon oxide compound doped with titanium and ferrum and coated with the carbon film was obtained.

The pH of the obtained material was 10.3, the electrical resistivity of the powder was 1 Ω*cm, the corresponding grain size of silicon was 4.6 nm, and aqueous slurry containing the material did not generate gas in more than one week during an acceleration test at 65° C. By testing, the reversible specific capacity of a half cell containing the silicon anode active material was 500.1 mAh/g, and the initial coulombic efficiency was 90.2%. The volume energy density of a full cell reached 768.4 Wh/L, the capacity retention rate after 500 cycles was 82.3%, and the expansion rate after 500 cycles was 11.8%.

Embodiment 20

Compared with Embodiment 19, silicon oxide compound particles with a median size of 5 μm were adopted in Embodiment 20, a carbon film coating process and a spray-drying process the same as those in Embodiment 19 were adopted. The dopant source was replaced with 8.8 g of magnesium acetate tetrahydrate and 108.5 g of ferric nitrate nonahydrate, and the powder obtained by spray-drying was heated at 900° C. for 3 hrs, so that silicon oxide compound particles doped with magnesium and ferrum and coated with a carbon film were obtained. Next, lithium doping was carried out through a thermal doping method, the quantity of lithium hydride was adjusted to 51.3 g, and the temperature was adjusted to 575° C. and maintained for 6 hrs in the heat treatment process, so that a lithium-containing silicon oxide compound doped with magnesium and ferrum and coated with the carbon film was obtained.

The pH of the obtained material was 10.8, the electrical resistivity of the powder was 8 Ω*cm, the corresponding grain size of silicon was 3.1 nm, and aqueous slurry containing the material did not generate gas in more than one week during an acceleration test at 65° C. By testing, the reversible specific capacity of a half cell containing the silicon anode active material was 533.2 mAh/g, and the initial coulombic efficiency was 89.3%. The volume energy density of a full cell reached 775.3 Wh/L, the capacity retention rate after 500 cycles was 87.2%, and the expansion rate after 500 cycles was 10.8%.

Embodiment 21

Compared with Embodiment 20, a carbon film coating process similar to that in Embodiment 20 was adopted, while the temperature was adjusted to 800° C. and maintained for 2 hrs in the heat treatment process. A spray-drying process the same as that in Embodiment 20 was adopted, the dopant source was replaced with 13.2 g of magnesium acetate tetrahydrate and 22 g of copper (II) acetate monohydrate, and powder obtained by spray-drying was heated at 800° C. for 3 hrs, so that silicon oxide compound particles doped with magnesium and copper and coated with a carbon film were obtained. The SEM image showed that there was no magnesium or copper substance left on the surface of the particles, which indicated that all magnesium and copper were doped into the silicon oxide compound. The EDS result showed that the magnesium and copper content in the surface layer of the particles was 0.2% and 0.7% respectively, which were close to the actual doping content of magnesium and copper in the silicon oxide compound, indicating that no magnesium or copper was concentrated in the surface layer. Next, lithium doping was carried out through a thermal doping method, the quantity of lithium hydride was adjusted to 28.5 g, and the temperature was adjusted to 550° C. and maintained for 6 hrs in the heat treatment process, so that a lithium-containing silicon oxide compound doped with magnesium and copper and coated with the carbon film was obtained.

The pH of the obtained material was 9.3, the electrical resistivity of the powder was 20 Ω*cm, the corresponding grain size of silicon was 1.2 nm, and aqueous slurry containing the material did not generate gas in more than one week during an acceleration test at 65° C. By testing, the reversible specific capacity of a half cell containing the silicon anode active material was 564.7 mAh/g, and the initial coulombic efficiency was 85.8%. The volume energy density of a full cell reached 757.8 Wh/L, the capacity retention rate after 500 cycles was 89%, and the expansion rate after 500 cycles was 9.7%.

Embodiment 22

Compared with Embodiment 20, silicon oxide compound particles with a median size of 9 μm were adopted in Embodiment 22. A carbon film coating process the same as that in Embodiment 20 was adopted. Then 1000 g of the particles were uniformly coated with 9.5 g of nano-alumina and 18.8 g of nano-copper oxide through a dry coating method, and the particles were heated at 900° C. for 3 hrs under a nitrogen atmosphere, so that a silicon oxide compound doped with aluminum and copper and coated with a carbon film was obtained. Next, lithium doping was carried out through a thermal doping method, the quantity of lithium hydride was adjusted to 57 g, and the temperature was adjusted to 700° C. and maintained for 5 hrs in the heat treatment process, so that a lithium-containing silicon oxide compound doped with aluminum and copper and coated with the carbon film was obtained.

The pH of the obtained material was 10.2, the electrical resistivity of the powder was 7 Ω*cm, the corresponding grain size of silicon was 4.2 nm, and aqueous slurry containing the material did not generate gas in more than one week during an acceleration test at 65° C. By testing, the reversible specific capacity of a half cell containing the silicon anode active material was 521.3 mAh/g, and the initial coulombic efficiency was 91.6%. The volume energy density of a full cell reached 793.2 Wh/L, the capacity retention rate after 500 cycles was 86.5%, and the expansion rate after 500 cycles was 12.1%.

Embodiment 23

Compared with Embodiment 20, a similar carbon film coating process was adopted in Embodiment 23. The temperature was adjusted to 1000° C. and maintained for 2.5 hrs in the heat treatment process. A spray-drying process the same as that in Embodiment 20 was adopted, while the dopant source was replaced with 166.7 g of aluminum nitrate nonahydrate, 4.3 g of yttrium nitrate hexahydrate and 223 g of manganese acetate tetrahydrate, and powder obtained by spray-drying was heated at 850° C. for 6 hrs, so that silicon oxide compound particles doped with aluminum, yttrium and manganese and coated with a carbon film were obtained. Next, lithium doping was carried out through a thermal doping method, and the quantity of lithium hydride was adjusted to 45.6 g, and the temperature was adjusted to 700° C. and maintained for 5 hrs in the heat treatment process, so that a lithium-containing silicon oxide compound doped with aluminum, yttrium and manganese and coated with the carbon film was obtained.

The pH of the obtained material was 9.8, the electrical resistivity of the powder was 0.1 Ω*cm, the corresponding grain size of silicon was 4.2 nm, and aqueous slurry containing the material did not generate gas in more than one week during an acceleration test at 65° C. By testing, the reversible specific capacity of a half cell containing the silicon anode active material was 511 mAh/g, and the initial coulombic efficiency was 91.1%. The volume energy density of a full cell reached 781.2 Wh/L, the capacity retention rate after 500 cycles was 86.6%, and the battery expansion rate after 500 cycles was 11.9%.

Embodiment 24

Compared with Embodiment 23, the same carbon film coating process and the same dry-spraying process were adopted in Embodiment 24, while the dopant source was replaced with 264 g of magnesium acetate tetrahydrate and 339.2 g of nickel (II) acetate tetrahydrate, and powder obtained by dry-spraying was heated at 800° C. for 8 hrs, so that silicon oxide compound particles doped with magnesium and nickel and coated with a carbon film were obtained. Next, lithium doping was carried out through a thermal doping method, and the quantity of lithium hydride was adjusted to 57 g, and the temperature was adjusted at 600° C. and maintained for 6 hrs in the heat treatment process, so that a lithium-containing silicon oxide compound doped with manganese and nickel and coated with the carbon film was obtained.

The pH of the obtained material was 10, the electrical resistivity of the powder was 0.01 Ω*cm, the corresponding grain size of silicon was 4.3 nm, and aqueous slurry containing the material did not generate gas in more than one week during an acceleration test at 65° C. By testing, the reversible specific capacity of a half cell containing the silicon anode active material was 492.4 mAh/g, and the initial coulombic efficiency was 90.3%. The volume energy density of a full cell reached 765.9 Wh/L, the capacity retention rate after 500 cycles was 87%, and the expansion rate after 500 cycles was 12%.

Embodiment 25

Compared with Embodiment 18, silicon oxide compound particles with a median size of 15 μm were adopted in Embodiment 25. A carbon film coating process the same as that in Embodiment 18 was adopted, and then 1000 g of the silicon oxide compound particles were uniformly coated with 8.35 g of nano-titanium oxide, 13.3 g of nano-alumina and 38.25 g of nano-nickel oxide and were maintained at 900° C. for 2 hrs under a nitrogen atmosphere, so that silicon oxide compound particles doped with titanium, aluminum and nickel and coated with a carbon film were obtained. Next, lithium doping was carried out through a thermal doping method, the quantity of lithium hydride was adjusted to 34.3 g, and the temperature was adjusted to 850° C. and maintained for 2 hrs in the heat treatment process, so that a lithium-containing silicon oxide compound doped with titanium, aluminum and nickel and coated with the carbon film was obtained.

The pH of the obtained material was 9.3, the electrical resistivity of the powder was 1 Ω*cm, the corresponding grain size of silicon was 10.2 nm, and aqueous slurry containing the material did not generate gas in more than one week during an acceleration test at 65° C. By testing, the reversible specific capacity of a half cell containing the silicon anode active material was 498 mAh/g, and the initial coulombic efficiency was 92.5%. The volume energy density of a full cell reached 768.4 Wh/L, the capacity retention rate after 500 cycles was 80.4%, and the expansion rate after 500 cycles was 14.3%.

Embodiment 26

Compared with Embodiment 19, silicon oxide compound particles with a median size of 5 μm were adopted in Embodiment 26. A carbon film coating process, a spray-drying process and a lithium doping process the same as those in Embodiment 19 were adopted, and the dopant source was replaced with 568.8 g of tetrabutyl titanate and 578.7 g of ferric nitrate nonahydrate, so that a lithium-containing silicon oxide compound doped with titanium and ferrum was obtained.

The pH of the obtained material was 9, the electrical resistivity of the powder was 0.05 Ω*cm, the corresponding grain size of silicon was 5.6 nm, and aqueous slurry containing the material did not generate gas in more than one week during an acceleration test at 65° C. By testing, the reversible specific capacity of a half cell containing the silicon anode active material was 470 mAh/g, and the initial coulombic efficiency was 91.6%. The volume energy density of a full cell reached 766.8 Wh/L, the capacity retention rate after 500 cycles was 85.8%, and the expansion rate after 500 cycles was 12.7%.

Embodiment 27

Compared with Embodiment 21, the same carbon film coating process and the same spray-drying process were adopted in Embodiment 27, while the dopant source was replaced with 4.4 g of magnesium acetate tetrahydrate and 1.57 g of copper (II) acetate monohydrate, so that silicon oxide compound particles doped with magnesium and copper and coated with a carbon film were obtained. Next, lithium doping was carried out through a thermal doping method, and the quantity of lithium hydride was adjusted to 57 g, and the temperature was adjusted at 600° C. and maintained for 6 hrs in the heat treatment process, so that a lithium-containing silicon oxide compound doped with magnesium and copper and coated with the carbon film was obtained.

The pH of the obtained material was 10.8, the electrical resistivity of the powder was 30 Ω*cm, the corresponding grain size of silicon was 1.9 nm, and aqueous slurry containing the material did not generate gas in more than one week during an acceleration test at 65° C. By testing, the reversible specific capacity of a half cell containing the silicon anode active material was 545 mAh/g, and the initial coulombic efficiency was 89.6%. The volume energy density of a full cell reached 783.2 Wh/L, the capacity retention rate after 500 cycles was 87.4%, and the expansion rate after 500 cycles was 10.6%.

Embodiment 28

Compared with Embodiment 27, a similar carbon film coating process was adopted in Embodiment 28, and the temperature was adjusted to 1000° C. and maintained for 2.5 hrs in the heat treatment process, so that a silicon oxide compound coated with a carbon film was obtained. Then, a spray-drying process the same as that in Embodiment 12 was adopted, the dopant source was replaced with 30.8 g of magnesium acetate tetrahydrate and 15.6 g of manganese acetate tetrahydrate, so that silicon oxide compound particles doped with magnesium and manganese and coated with a carbon film were obtained. Next, a lithium doping process the same as that in Embodiment 12 was adopted, so that lithium-containing silicon oxide compound doped with magnesium and manganese and coated with the carbon film was obtained.

The pH of the obtained material was 10.6, the corresponding grain size of silicon was 3.2 nm, and aqueous slurry containing the material did not generate gas in more than one week during an acceleration test at 65° C. By testing, the reversible specific capacity of a half cell containing the silicon anode active material was 532 mAh/g, and the initial coulombic efficiency was 89.9%. The volume energy density of a full cell reached 780 Wh/L, the capacity retention rate after 500 cycles was 86.8%, and the expansion rate after 500 cycles was 11.1%.

Embodiment 29

This embodiment is similar to Embodiment 27 and differs from Embodiment 27 in that the dopant source was replaced with 8.8 g of magnesium acetate tetrahydrate in the spray-drying process, so that a lithium-containing silicon oxide compound only doped with magnesium was obtained.

The pH of the obtained material was 10.8, the electrical resistivity of the powder was 46 Ω*cm, the corresponding grain size of silicon was 1.9 nm, and aqueous slurry containing the material did not generate gas in 72 hrs during an acceleration test at 65° C. By testing, the reversible specific capacity of a half cell containing the silicon anode active material was 545 mAh/g, and the initial coulombic efficiency was 89%. The volume energy density of a full cell reached 779 Wh/L, the capacity retention rate after 500 cycles was 86.4%, and the expansion rate after 500 cycles was 10.6%.

Embodiment 30

1000 g of silicon oxide compound particles with a median size of 5 μm (the atomic ratio of silicon to oxygen was 1:1) were mixed with 100 g of lithium hydride, lithium doping was carried out through a thermal doping method, and the temperature was adjusted to 800° C. and maintained for 2 hrs in the heat treatment process, so that a lithium-containing silicon oxide compound was obtained. Then, 500 g of the silicon oxide compound particles were mixed with 25 g of magnesium powder and 9.4 g of nano-copper oxide and were maintained at 850° C. for 1.5 hrs under an argon atmosphere, so that lithium-containing silicon oxide compound particles doped with magnesium and copper were obtained. Finally, the particles were coated with a carbon film through a chemical vapor deposition method by carrying out a coating reaction at 850° C. for 1 h with acetylene as a carbon source, so that lithium-containing silicon oxide compound particles doped with magnesium and copper and coated with a carbon film were obtained.

The pH of the obtained material was 9.5, the corresponding grain size of silicon was 26 nm, and aqueous slurry containing the material did not generate gas in more than one week during an acceleration test at 65° C. By testing, the reversible specific capacity of a half cell containing the silicon anode active material was 461.6 mAh/g, and the initial coulombic efficiency was 92.8%. The volume energy density of a full cell reached 726.8 Wh/L, the capacity retention rate after 500 cycles was 76.1%, and the expansion rate after 500 cycles was 17.8%.

Contrastive Embodiment 1

This contrastive embodiment is similar to Embodiment 5 and differs from Embodiment 5 in that the spray-drying process and the lithium doping process were omitted, so that a product obtained in this contrastive embodiment was a silicon oxide compound coated with a carbon film.

The pH of the obtained material was 7.4, the corresponding grain size of silicon was 2.7 nm, and aqueous slurry containing the material did not generate gas in more than one week during an acceleration test at 65° C. By testing, the reversible specific capacity of a half cell containing the silicon anode active material was 580.5 mAh/g, and the initial coulombic efficiency was 83%. The volume energy density of a full cell reached 723 Wh/L, the capacity retention rate after 500 cycles was 90%, and the expansion rate after 500 cycles was 9.5%.

Contrastive Embodiment 2

This contrastive embodiment is similar to Embodiment 5 and differs from Embodiment 5 in that the spray-drying process and corresponding heat treatment for magnesium doping were omitted, so that a product obtained in this contrastive embodiment was a lithium-containing silicon oxide compound coated with a carbon film.

The pH of the obtained material was 9.5, the corresponding grain size of silicon was 2.7 nm, and aqueous slurry containing the material generated gas in 1 h during an acceleration test at 65° C. By testing, the reversible specific capacity of a half cell containing the silicon anode active material was 562 mAh/g, and the initial coulombic efficiency was 86.1%. Due to the poor stability of the slurry, the problems of gas generation and deterioration of the rheological property occurred during the homogenizing and coating process, which led to poor quality of the electrode with defects of too many pits, poor adhesion and powder peeling-off, thus greatly affecting the performance of a full battery. The volume energy density of the full cell was 728.9 Wh/L, the capacity retention rate after 500 cycles was 79%, and the expansion rate after 500 cycles was 15.2%.

Contrastive Embodiment 3

This contrastive embodiment is similar to Embodiment 11 and differs from Embodiment 11 in that the quantity of lithium hydride was adjusted to 148.2 g in the lithium doping process, so that a product obtained in this contrastive embodiment was a lithium-containing silicon oxide compound doped with aluminum and coated with a carbon film.

The pH of the obtained material was 12.5, the corresponding grain size of silicon was 18 nm, and aqueous slurry containing the material generated gas in 12 hrs during an acceleration test at 65° C. By testing, the reversible specific capacity of a half cell containing the silicon anode active material was 429 mAh/g, and the initial coulombic efficiency was 93.4%. The volume energy density of a full cell reached 733.1 Wh/L, the capacity retention rate after 500 cycles was 76%, and the expansion rate after 500 cycles was 13%.

Contrastive Embodiment 4

This contrastive embodiment is similar to Embodiment 23 and differs from Embodiment 23 in that the quantity of lithium hydride was adjusted to 125.4 g in the lithium doping process, so that a product obtained in this contrastive embodiment is a lithium-containing silicon oxide compound doped with aluminum, yttrium and manganese and coated with a carbon film.

The pH of the obtained material was 12.5, the corresponding grain size of silicon was 17 nm, and aqueous slurry containing the material generated gas in 12 hrs during an acceleration test at 65° C. By testing, the reversible specific capacity of a half cell containing the silicon anode active material was 417 mAh/g, and the initial coulombic efficiency was 93.4%. The volume energy density of a full cell reached 728 Wh/L, the capacity retention rate after 500 cycles was 76%, and the expansion rate after 500 cycles was 13%.

Contrastive Embodiment 5

1000 g of silicon oxide compound particles with a median size of 6 μm (the atomic ratio of silicon to oxygen was 1:1), 65 g of low-temperature coal asphalt powder, and 10 g of ketjen black powder were evenly mixed in a coating machine through a dry method. 2000 g of dimethylformamide was added during stirring, and the mixed powder was evenly dispersed in the dimethylformamide Next, the coating machine was heated to 140° C. and was maintained at this temperature for stirring for 3 hrs, and finally, the coating machine was heated to 160° C. and was maintained at this temperature until the dimethylformamide was desiccated, so that a silicon oxide compound material coated with coal asphalt and ketjen black was obtained. The material was heated to 1000° C. under a nitrogen atmosphere and was maintained for 2 hrs to carbonize the coal asphalt, and the silicon oxide compound was disproportionated at the same time. After being cooled, the material was crushed and then screened with a 500-mesh screen, so that silicon oxide compound powder coated with a carbon/ketjen black composite film was obtained.

Figure 5:
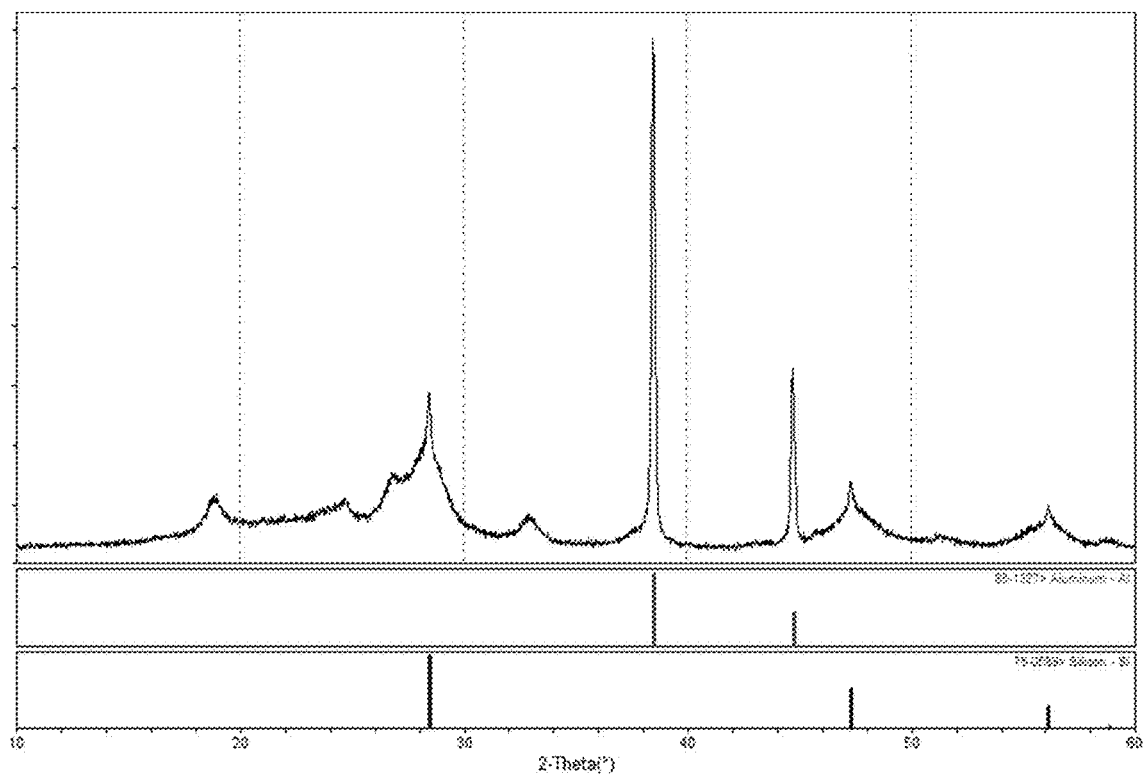
FIG. 5 is an X-ray diffraction pattern of a silicon anode active material prepared in Contrastive Embodiment 5.

In a drying room with the relative humidity less than 10%, lithium aluminum hydride coarse powder was crushed by a planetary ball mill and then screened with a 500-mesh screen, so that lithium aluminum hydride fine powder was obtained. 150 g of the lithium aluminum hydride fine powder and 500 g of the silicon oxide compound powder coated with a carbon/ketjen black composite film were mixed in a VC mixer at a high speed for 20 min. The mixed powder was placed in a tube furnace, so that lithium and aluminum were doped into the silicon oxide compound at the same time under an argon atmosphere. It was heated to 600° C. at a rate of 10° C./min and maintained for 6 hrs. After being cooled, the material was taken out of the tube furnace and was screened with a 500-mesh screen, so that a lithium-containing silicon oxide compound doped with aluminum was obtained. The X-Ray diffraction pattern showed that the obtained silicon anode active material had an obvious metal aluminum phase (as shown in FIG. 5), which indicated that through the aluminum dopant source and process in this contrastive embodiment, it was more likely to obtain the aluminum doping in metal phase (reduction state) rather than an aluminum and oxygen containing compound phase. Because the metal aluminum phase cannot effectively protect the lithium-containing silicon oxygen material and may even promote a gas generation reaction with water, aqueous slurry containing the material generated gas sharply within 1 h during an acceleration test at 65° C. Meanwhile, as shown in FIG. 5, the nano-silicon grains have two sizes, of which one was 5.4 nm and the other was 71 nm, indicating that the presence of aluminum promoted local growth of silicon grains.

By testing, the reversible specific capacity of a half cell containing the silicon anode active material was 432 mAh/g, and the initial coulombic efficiency was 87%. The volume energy density of a full cell reached 702.3 Wh/L. Due to severe gas generation of the slurry, the quality of an anode plate was extremely poor, the capacity retention rate of the full cell containing the anode plate after 500 cycles was 68%, and the expansion rate after 500 cycles was 21%.

Contrastive Embodiment 6

This contrastive embodiment is similar to Contrastive Embodiment 5 and differs from Contrastive Embodiment 5 in the following aspects: in the lithium and aluminum doping process, the quantity of lithium aluminum hydride was adjusted to 100 g, and the temperature was adjusted to 770° C. and maintained for 1 h for heat treatment for lithium doping and aluminum doping, so that a lithium-containing silicon oxide compound doped with aluminum was obtained. The X-Ray diffraction pattern showed that the obtained silicon anode active material still has an obvious metal aluminum phase, and the corresponding grain size of silicon was 26 nm. Aqueous slurry containing the material still generated gas severely within 1 h during an acceleration test at 65° C. By testing, the reversible specific capacity of a half cell containing the silicon anode active material was 485 mAh/g, and the initial coulombic efficiency was 89%. The volume energy density of a full cell reached 749 Wh/L, the capacity retention rate after 500 cycles was 73.2%, and the expansion rate after 500 cycles was 19%.

Contrastive Embodiment 7

1000 g of silicon oxide compound particles, 10 g of Super P powder, 203 g of cupric citrate and 50 g of sucrose were dispersed in 5000 g of deionized water at a high speed and were then spray-dried; and then, obtained powder was heated at 900° C. for 5 hrs under a nitrogen atmosphere and was then crushed and screened with a 500-mesh screen, so that copper-doped silicon oxide compound particles coated with a carbon/Super P composite film were obtained. 500 g of the copper-doped silicon oxide compound particles were mixed with 50 g of lithium hydride, mixed powder was placed in a tube furnace and was then heated to 750° C. at a rate of 10° C./min and maintained at this temperature for 1 h for heat treatment under an argon atmosphere. After cooling down, the material was taken out of the tube furnace and screened with a 500-mesh screen, so that a lithium-containing silicon oxide compound doped with copper and coated with the carbon/Super P composite film was obtained.

The corresponding grain size of silicon was 9 nm, and aqueous slurry containing the material generated gas in 2 hrs during an acceleration test at 65° C. By testing, the reversible specific capacity of a half cell containing the silicon anode active material was 502 mAh/g, and the initial coulombic efficiency was 88.7%. The volume energy density of a full cell reached 752 Wh/L, the capacity retention rate after 500 cycles was 76.5%, and the expansion rate after 500 cycles was 16.8%.

Contrastive Embodiment 8

1000 g of silicon oxide compound particles with a median size of 6 μm (the atomic ratio of silicon to oxygen was 1:1) and 65 g of low-temperature coal asphalt powder were evenly mixed in a coating machine through a dry method. 2000 g of dimethylformamide was added during stirring, and the mixed powder was evenly dispersed in the dimethylformamide. Then, the coating machine was heated to 140° C. and was maintained at this temperature for stirring for 3 hrs. Finally, the coating machine was heated to 160° C. and maintained at this temperature until the dimethylformamide was desiccated, so that a silicon oxide compound material coated with coal asphalt was obtained. The material was heated to 900° C. under a nitrogen atmosphere and was maintained at this temperature for 3 hrs to carbonize the coal asphalt. The silicon oxide compound was disproportionated at the same time. After being cooled, the material was crushed and screened with a 500-mesh screen, so that silicon oxide compound powder coated with a carbon film was obtained.

In a drying room with the relative humidity less than 30%, lithium hydride powder was crushed by a planetary ball mill and was then screened with a 600-mesh screen, so that lithium hydride fine powder with a maximum particle size of about 23 μm was obtained. 50 g of the lithium hydride fine powder and 500 g of the silicon oxide compound powder coated with the carbon film were mixed in a VC mixer at a high speed for 20 min. Mixed powder was placed in a tube furnace and was heated to 750° C. at a rate of 10° C./min and maintained at this temperature for 60 min for lithium-doping heat treatment under an argon atmosphere. After cooling down, the material was taken out of the tube furnace and was screened with a 500-mesh screen, so that a silicon-based composite material was obtained.

The corresponding grain size of silicon in the obtained silicon anode active material was 6.5 nm, and aqueous slurry containing the material generated gas sharply in 1 h during an acceleration test at 65° C. By testing, the reversible specific capacity of a half cell containing the silicon anode active material was 508 mAh/g, and the initial coulombic efficiency was 88%. The volume energy density of a full cell reached 753.1 Wh/L, the capacity retention rate after 500 cycles was 76.2%, and the expansion rate after 500 cycles was 16.1%.

Obviously, the above embodiments are merely examples used for clearly explaining the application, and are not intended to limit the implementations of the application. Those ordinarily skilled in the art can make other variations or alterations on the basis of the above description, and not all implementations are exhausted here. All obvious variations or alterations derived from the above embodiments shall fall within the protection scope of the application.

What is claimed is:

1. An anode active material for batteries, comprising anode active substance particles, the anode active substance particles comprising a silicon oxide compound,
    wherein the anode active substance particles further comprise lithium and a non-lithium doping metal, and
    wherein the non-lithium doping metal comprises a metal M1 including one or more of titanium, magnesium, zirconium, zinc, aluminum, yttrium and calcium, and a content of the metal M1 in the anode active material is 0.01-20 wt %;
    wherein the metal M1 exists in the anode active material is in a form of an oxygen-containing compound, and the oxygen-containing compound is dispersedly distributed in the silicon oxide compound; and
    wherein the anode active substance particles further comprise nano-silicon grains that are regularly dispersed in the anode active substance particles, and a median size of the nano-silicon grains is 1-15 nm.

2. The anode active material for batteries according to claim 1, wherein the non-lithium doping metal further comprises a metal M2 including one or more of copper, nickel, ferrum, manganese, cobalt and chromium.

3. The anode active material for batteries according to claim 2, wherein a content of the metal M2 in the anode active material is 0.01-20 wt %.

4. The anode active material for batteries according to claim 2, wherein total contents of the metal M1 and the metal M2 in the anode active material are 0.01-25 wt %.

5. The anode active material for batteries according to claim 1, wherein the oxygen-containing compound of the non-lithium doping metal comprises one or more of a metal oxide, a metal silicate, a lithium-containing composite metal silicate, and a composite oxide of lithium and a non-lithium doping metal.

6. The anode active material for batteries according to claim 1, wherein the oxygen-containing compound is concentrated on a surface layer of the silicon oxide compound, and concentration of the oxygen-containing compound decreases gradually from the surface layer to an interior of the silicon oxide compound.

7. The anode active material for batteries according to claim 2, wherein the metal M2 exists in the anode active material in a form of an elemental metal phase or a silicon alloy phase.

8. The anode active material for batteries according to claim 1, wherein a content of the lithium in the anode active substance particles is 0.1-20 wt %.

9. The anode active material for batteries according to claim 1, wherein the anode active substance particles comprise at least one lithium-containing compound selected from $Li_4SiO_4$, $Li_2SiO_3$, $Li_6Si_2O_7$, $Li_8SiO_6$ and $Li_2Si_2O_5$.

10. The anode active material for batteries according to claim 1, wherein a median size of the anode active substance particles is 0.2-20 μm.

11. The anode active material for batteries according to claim 1, wherein a content of silicon in the anode active substance particles is 30-80 wt %.

12. The anode active material for batteries according to claim 1, wherein the anode active substance particles are coated with a carbon film covering a surface of the silicon oxide compound, and a thickness of the carbon film is 0.001-5 μm.

13. The anode active material for batteries according to claim 12, wherein a weight ratio of the carbon film and the silicon oxide compound is 0.01:100-20:100 .

14. An electrode, comprising the anode active material according to claim 1.

15. A method for preparing the anode active material according to claim 1, comprising:
    preparing silicon oxide compound particles; and
    doping lithium and a non-lithium metal into the silicon oxide compound particles, wherein a stoichiometric ratio of silicon and oxygen in the silicon oxide compound particles is 1:0.4-1:2;
    wherein the lithium is doped into the silicon oxide compound particles after the non-lithium metal is doped into the silicon oxide compound particles;
    wherein a doping temperature of the non-lithium metal is 750-1100° C.

16. The method according to claim 15, wherein a median size of the silicon oxide compound particles is 0.2-20 μm.

17. The method according to claim 15, wherein the silicon oxide compound particles are coated with a carbon film.

* * * * *